(12) United States Patent
Strandjord et al.

(10) Patent No.: US 8,908,187 B2
(45) Date of Patent: Dec. 9, 2014

(54) SYSTEM AND METHOD FOR REDUCING ERRORS IN A RESONATOR FIBER OPTIC GYROSCOPE

(75) Inventors: Lee K. Strandjord, Tonka Bay, MN (US); Tiequn Qiu, Glendale, AZ (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 204 days.

(21) Appl. No.: 13/287,422

(22) Filed: Nov. 2, 2011

(65) Prior Publication Data

US 2013/0107271 A1 May 2, 2013

(51) Int. Cl.
G01C 19/64 (2006.01)
G01C 19/72 (2006.01)

(52) U.S. Cl.
CPC ............ *G01C 19/727* (2013.01); *G01C 19/722* (2013.01)
USPC .......................................... 356/461; 356/459

(58) Field of Classification Search
CPC .... G01C 19/72; G01C 19/721; G01C 19/722; G01C 19/727
See application file for complete search history.

(56) References Cited

U.S. PATENT DOCUMENTS

| | | | |
|---|---|---|---|
| 4,135,822 A | 1/1979 | Ezekiel | |
| 4,274,742 A | 6/1981 | Lustig | |
| 4,323,310 A | 4/1982 | Shaw | |
| 4,352,562 A | 10/1982 | Minden | |
| 4,673,293 A | 6/1987 | Sanders | |
| 4,702,600 A | 10/1987 | Handrich et al. | |
| 4,807,999 A | 2/1989 | Soo Hoo | |
| 4,863,272 A | 9/1989 | Coccoli | |
| 5,018,857 A | 5/1991 | Sanders | |
| 5,031,235 A | 7/1991 | Raskin | |
| 5,090,809 A | 2/1992 | Ferrar | |
| RE34,121 E | 11/1992 | Benoist | |
| 5,229,831 A | 7/1993 | Carroll | |
| 5,237,387 A | 8/1993 | Sanders | |

(Continued)

FOREIGN PATENT DOCUMENTS

| | | |
|---|---|---|
| EP | 0240949 | 10/1987 |
| EP | 1391693 | 2/2004 |

(Continued)

OTHER PUBLICATIONS

Strandjord, "Title: System and Method for Enhancing Signal-to-Noise Ratio of a Resonator Fiber Optic Gyroscope", Filed May 28, 2010, pp. 1-22, Published in: U.S. Appl. No. 12/789,972.

(Continued)

*Primary Examiner* — Michael A Lyons
*Assistant Examiner* — Hina F Ayub
(74) *Attorney, Agent, or Firm* — Fogg & Powers LLC

(57) ABSTRACT

An exemplary resonator fiber optic gyroscope comprises a resonator having an optical fiber loop; a light source configured to generate a light beam; and an intensity modulation circuit coupled between the light source and the resonator. The intensity modulation circuit is configured to modulate the intensity of the light beam from the light source to output an intensity modulated signal to the resonator. The intensity modulation circuit is configured to produce the intensity modulated signal such that harmonics of the intensity modulated signal which overlap a primary wave of a counter-propagating light beam in the resonator have an amplitude below a predetermined threshold. Amplitudes below the predetermined threshold are negligible.

20 Claims, 13 Drawing Sheets

(56) References Cited

U.S. PATENT DOCUMENTS

| | | | |
|---|---|---|---|
| 5,289,258 A | 2/1994 | Szafraniec | |
| 5,289,550 A | 2/1994 | Plastow | |
| 5,296,912 A | 3/1994 | Strandjord et al. | |
| 5,327,279 A | 7/1994 | Farina | |
| 5,349,441 A | 9/1994 | Sanders | |
| 5,365,338 A | 11/1994 | Bramson | |
| 5,384,637 A | 1/1995 | Sanders | |
| 5,459,575 A | 10/1995 | Malvern | |
| 5,465,149 A | 11/1995 | Strandjord et al. | |
| 5,469,257 A | 11/1995 | Blake | |
| 5,493,623 A | 2/1996 | Frische et al. | |
| 5,610,714 A | 3/1997 | Malvern | |
| 5,732,333 A | 3/1998 | Cox et al. | |
| 5,734,469 A | 3/1998 | Strandjord | |
| 5,767,968 A | 6/1998 | Strandjord | |
| 5,781,300 A | 7/1998 | Strandjord | |
| 5,793,782 A | 8/1998 | Meyrueix | |
| 5,926,275 A | 7/1999 | Sanders | |
| 6,008,926 A | 12/1999 | Moodie | |
| 6,014,217 A | 1/2000 | Sanders et al. | |
| 6,091,864 A | 7/2000 | Hofmeister | |
| 6,101,296 A | 8/2000 | Tavlykaev | |
| 6,204,921 B1* | 3/2001 | Strandjord et al. | 356/460 |
| 6,236,772 B1 | 5/2001 | Tavlykaev | |
| 6,400,490 B1 | 6/2002 | Hosoi | |
| 6,539,155 B1 | 3/2003 | Broeng | |
| 6,574,260 B2 | 6/2003 | Salvatore | |
| 6,690,687 B2 | 2/2004 | Ksendzov | |
| 6,765,678 B2 | 7/2004 | Strandjord | |
| 6,778,279 B2* | 8/2004 | Lange et al. | 356/483 |
| 6,778,309 B2 | 8/2004 | Freund | |
| 6,897,993 B2 | 5/2005 | Steinle | |
| 6,943,931 B1 | 9/2005 | Dingel | |
| 7,023,601 B2 | 4/2006 | McGhan | |
| 7,079,780 B1 | 7/2006 | Rollins | |
| 7,142,342 B2 | 11/2006 | Bour | |
| 7,245,381 B2 | 7/2007 | Marino | |
| 7,372,574 B2 | 5/2008 | Sanders et al. | |
| 7,400,788 B2 | 7/2008 | Magde | |
| 7,583,869 B2 | 9/2009 | Kang | |
| 7,583,894 B2 | 9/2009 | Kang | |
| 7,751,055 B2 | 7/2010 | Sanders et al. | |
| 7,855,789 B2 | 12/2010 | Strandjord | |
| 7,869,052 B2 | 1/2011 | Strandjord | |
| 7,933,020 B1* | 4/2011 | Strandjord et al. | 356/461 |
| 8,139,281 B1* | 3/2012 | Wang et al. | 359/239 |
| 2004/0061863 A1 | 4/2004 | Digonnet | |
| 2004/0240025 A1 | 12/2004 | Bour | |
| 2004/0263856 A1* | 12/2004 | Willig et al. | 356/460 |
| 2005/0105642 A1 | 5/2005 | Muller | |
| 2006/0078336 A1 | 4/2006 | McNicol | |
| 2007/0133003 A1 | 6/2007 | Sanders | |
| 2008/0044124 A1 | 2/2008 | Sugiyama | |
| 2010/0002239 A1 | 1/2010 | Strandjord et al. | |
| 2010/0225922 A1 | 9/2010 | Strandjord | |
| 2010/0253948 A1* | 10/2010 | Strandjord et al. | 356/464 |

FOREIGN PATENT DOCUMENTS

| | | |
|---|---|---|
| JP | 61222288 | 10/1986 |
| JP | 2000216466 | 8/2000 |
| JP | 2001066142 | 3/2001 |
| JP | 2007163486 | 6/2007 |
| WO | 2006018952 | 2/2006 |

OTHER PUBLICATIONS

Strandjord, "RFOG With Optical Heterodyning for Optical Signal Discrimination", "U.S. Appl. No. 12/876,796, filed Sep. 7, 2010", pp. 1-28.
Broeng et al., "Photonic Crystal Fibers: A New Class of Optical Waveguides", "Optical Fiber Technology", 1999, pp. 305-330, vol. 5, Publisher: Academic Press.
Carroll, "Backscatter and the Resonant Fiber-Optic Gyro Scale Factor", "Journal of Lightwave Technology", Dec. 1989, pp. 1895-1900, vol. 7, No. 12, Publisher: IEEE.
Carroll, "The Passive Resonator Fiber Optic Gyro and Comparison to the Interferometer Fiber Gyro", "Fiber Optic Gyros 10th Anniversary Conference", 1986, pp. 486-494, vol. 719, 169, 177, Publisher: SPIE.
Chen et al., "Highly birefringent hollow-core photonic bandgap fiber", "Optics Express 3888", Aug. 9, 2004, pp. 3888-3893, vol. 12, No. 16, Publisher: Optical Society of America.
R.F. Cregan et al., "Single-Mode Photonic Band Gap Guidance of Light in Air", Sep. 3, 1999, pp. 1537-1539, vol. 285, Published in: US.
Ezekiel, "Passive Ring Resonator Laser Gyroscope", "Applied Physics Letters", May 1, 1977, pp. 478-480, vol. 30, No. 9, Publisher: American Institute of Physics.
Hansen et al., "Air-Guiding Photoni Bandgap Fibers: Spectral Properties, Macrobending Loss, and Practical Handling", "Journal of Lightwave Technology", Jan. 2004, pp. 11-13, vol. 22, No. 1, Publisher: IEEE.
Hotate et al., "Resonator Fiber Optic Gyro Using Digital Serrodyne Modulation-Method to Reduce the Noise Induced by the Backscattering a", "13th International Conference on Optical Fiber Sensors", Apr. 12-16, 1999, pp. 104-107, vol. 3746, Publisher: SPIEE.
Hotate, "Drift Reduction in an Optical Passive Ring-Resonator Gyro", "Fiber Optic Gyros: 15th Anniversary Conference", 1991, pp. 116-127, vol. 1585, Publisher: SPIE.
Hotate, "Adjustment-Free Method to Eliminate the Noise Induced by the Backscattering in an Optical Passive Ring-Resonator Gyro", "IEEE Photonics Technology Letters", Jan. 1990, pp. 75-77, vol. 2, No. 1, Publisher: IEEE.
Iwatsuki, "Effect of Rayleigh Backscattering in an Optical Passive Ring-Resonator Gyro", "Applied Optics", Nov. 1, 1984, pp. 3916-3924, vol. 23, No. 21, Publisher: Optical Society of America.
Kaiser, "Experimental Developments in the RFOG", "Fiber Optic and Laser Sensors VIII", 1990, pp. 121-126, vol. 1367, Publisher: SPIE.
Mangan et al., "Low Loss (1.7dB/km) Hollow Core Photonic Bandgap Fiber", 2004, pp. 1-3, Publisher: Optical Society of America.
Rakhmanov, "Demodulation of Intensity and Shot Noise in the Optical Heterodyne Detection of Laser Interferometers for Gravitational WA", "Applied Optics", Dec. 20, 2001, pp. 6596-6605, vol. 40, No. 36.
Sanders, Glen, "Critical Review of Resonator Fiber Optic Gyroscope Technology", "Proc. SPIE Fiber Optic and Laser Sensors X", Sep. 1992, pp. 133-159, vol. CF44, Publisher: SPIEE, Published in: Boston, MA.
Sanders et al., "Passive Ring Resonator Method for Sensitive Inertial Rotation Measurements in Geophysics and Relativity", "Optics Letter", Nov. 1981, pp. 569-571, vol. 6, No. 11, Publisher: Optical Society of America.
Sanders et al., "Novel Polarization-rotating Fiber Resonator for Rotation Sensing Applications", "Fiber Optic and Laser Sensors VII", 1989, pp. 373-381, vol. 1169, Publisher: Proc. SPIE.
Sanders et el., "Fiber Optic Gyro Technology Trends—A Honeywell Perspective", "Optical Fiber Sensors Conference Technical Digest", 2002, pp. 5-8, vol. 1, Publisher: IEEE.
Smith et al., "Recent Developments in Fiberoptic Ring Laser Gyros", "Fiber Optic and Laser Sensors VIII", 1990, pp. 103-106, vol. 1367, Publisher: SPIE.
Strandjord et al., "Performance Improvements of a Polarization-Rotating Resonator Fiber Optic Gyroscope", "Fiber Optic and Laser Sensors X", 1992, pp. 94-104, vol. 1795, Publisher: SPIE.
Suzuki et al., "Reduction of Backscattering Induced Noise by Ternary Phase Shift Keying in Monolithically Integrated Micro Optic Gyro on", "13th International Conference on Optical Fiber Sensors", Apr. 12-16, 1999, pp. 78-81, vol. 3746, Publisher: SPIE.
European Patent Office, "Communication under Rule 71(3) EPC", "from Foreign Counterpart of U.S. Appl. No. 12/167,056", May 2, 2012, pp. 1-41, Published in: EP.
European Patent Office, "Office Action", "from Foreign Counterpart of U.S. Appl. No. 12/167,056", Oct. 12, 2011, pp. 1-5, Published in: EP.
European Patent Office, "European Search Report", "from Foreign Counterpart of U.S. Appl. No. 12/167,056", Sep. 6, 2011, pp. 1-3, Published in: EP.

(56) References Cited

OTHER PUBLICATIONS

Japan Patent Office, "Notification of Reasons for Rejection", "from Foreign Counterpart of U.S. Appl. No. 12/167,056", Mar. 22, 2013, pp. 1-7, Published in: JP.

U.S. Patent and Trademark Office, "Notice of Allowance", "U.S. Appl. No. 12/167,056", Aug. 23, 2010, pp. 1-14.
U.S. Patent and Trademark Office, "Restriction Requirement", "U.S. Appl. No. 12/167,056", Jun. 14, 2010, pp. 1-5.

* cited by examiner

US 8,908,187 B2

SYSTEM AND METHOD FOR REDUCING ERRORS IN A RESONATOR FIBER OPTIC GYROSCOPE

BACKGROUND

Gyroscopes (also referred to herein as gyros) have been used to measure rotation rates or changes in angular velocity about an axis of rotation. A basic conventional fiber-optic gyro (FOG) includes a light source, a beam-generating device, and a coil of optical fiber coupled to the beam generating device that encircles an area. The beam-generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different path lengths while propagating around a rotating closed optical path, and the difference in the two path lengths is proportional to the rotational rate that is normal to the enclosed area.

In a conventional resonator FOG (RFOG), the counter-propagating light beams are typically monochromatic (e.g., in a single frequency) and circulate through multiple turns of the fiber-optic coil and for multiple passes through the coil using a device, such as a fiber coupler, that redirects light that has passed through the coil back into the coil again (i.e., circulates the light). The beam-generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength $\lambda$ is referred to as "on resonance" when the round trip resonator path length is equal to an integral number of wavelengths. A rotation about the axis of the coil produces a different path length for clockwise and counterclockwise propagation, thus producing a shift between the respective resonance frequencies of the resonator. The frequency difference, such as may be measured by tuning the CW beam and CCW beam frequencies to match the resonance frequency shift of the closed optical path due to rotation, indicates the rotation rate. In a typical RFOG operation, common cavity modulation for resonance detection is considered advantageous because the distortions in modulation that would cause an induced bias for CW and CCW lightwaves can be cancelled effectively. However, common cavity modulation makes it difficult to separate the primary lightwaves from interference with the back scattered lightwaves propagating in the opposite direction.

SUMMARY

In one embodiment, a resonator fiber optic gyroscope (RFOG) is provided. The resonator fiber optic gyroscope comprises a resonator having an optical fiber loop; a light source configured to generate a light beam; and an intensity modulation circuit coupled between the light source and the resonator. The intensity modulation circuit is configured to modulate the intensity of the light beam from the light source to output an intensity modulated signal to the resonator. The intensity modulation circuit is configured to produce the intensity modulated signal such that harmonics of the intensity modulated signal which overlap a primary wave of a counter-propagating light beam in the resonator have an amplitude below a predetermined threshold. Amplitudes below the predetermined threshold are negligible.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
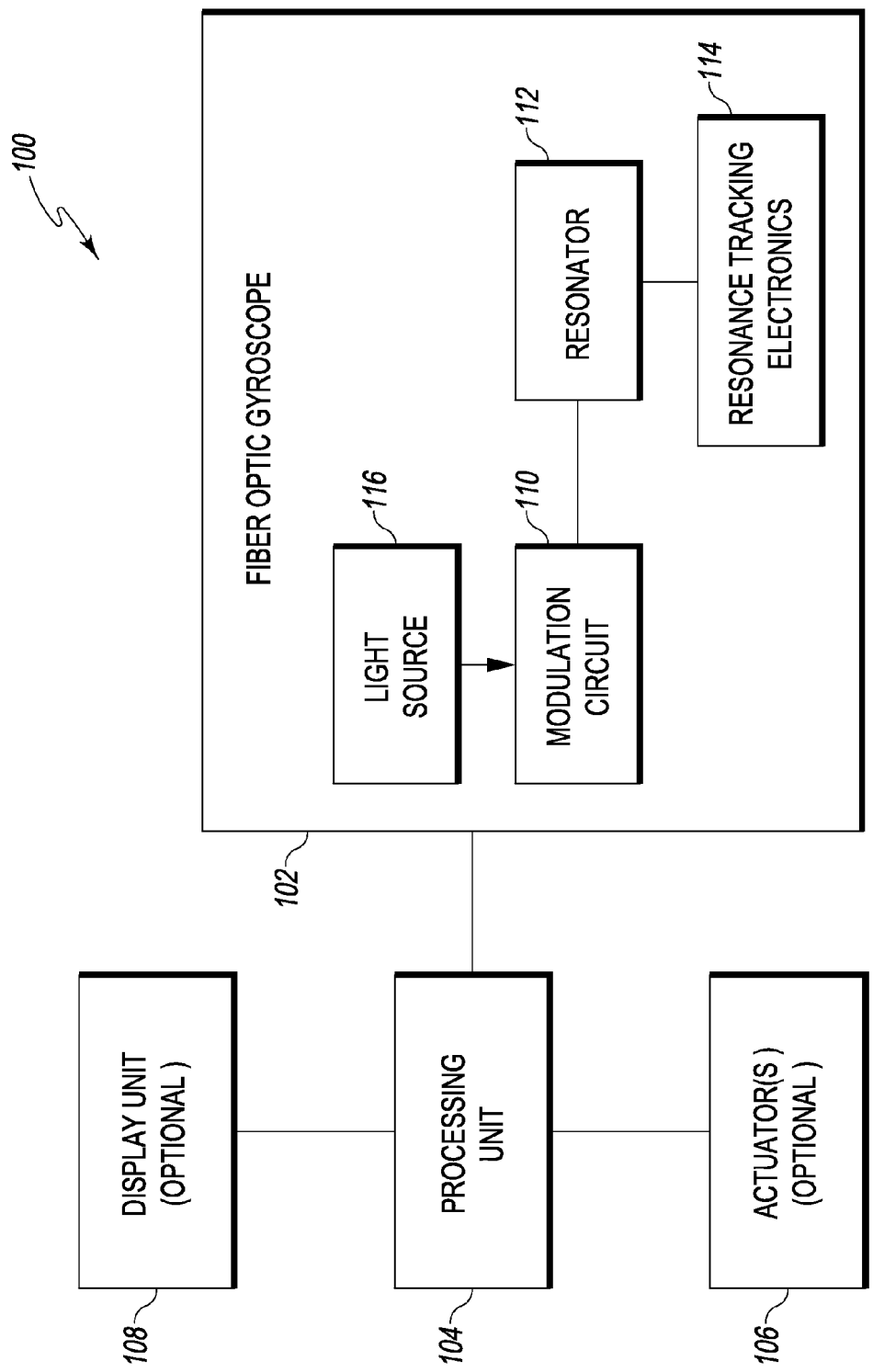
FIG. 1 is a block diagram of one embodiment of a system utilizing a resonator fiber optic gyroscope.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a system 100 utilizing an RFOG 102. The system 100 is a navigation system in this embodiment. However, it is understood that, in other embodiments resonator fiber-optic gyroscope (RFOG) 102 can be used in other systems, such as, but not limited to, a platform stabilization system or a pointing system. For example, in some embodiments, the RFOG 102 is implemented as part of an inertial sensor unit that includes one or more RFOGs and one or more linear accelerometers. The RFOG 102 measures rotation rate and outputs a signal indicative of rotation rate to a processing unit 104. The processing unit 104 uses the measured rotation rate from the RFOG 102 to calculate parameters such as position, orientation, and angular velocity.

The processing unit 104 uses the calculated parameters, in some embodiments, to calculate control signals that are outputted to one or more optional actuators 106. For example, in some embodiments, the navigation system 100 is implemented in an unmanned vehicle. Hence, the actuators 106 are implemented according to the vehicle type. For example, in an unmanned aerial vehicle, the actuators 106 are implemented as wing flaps, thrusters, etc.

Additionally, in some embodiments, the processing unit 104 outputs the calculated parameters to an optional display unit 108. For example, in some embodiments, the display unit 108 displays the geographic location, velocity, and/or orientation (e.g. pitch, roll, and/or yaw) of a vehicle in which the RFOG 102 is located. The display unit 108 can be implemented as any suitable display unit such as, but not limited to, various CRT, active and passive matrix LCD, and plasma display units.

Figure 3:
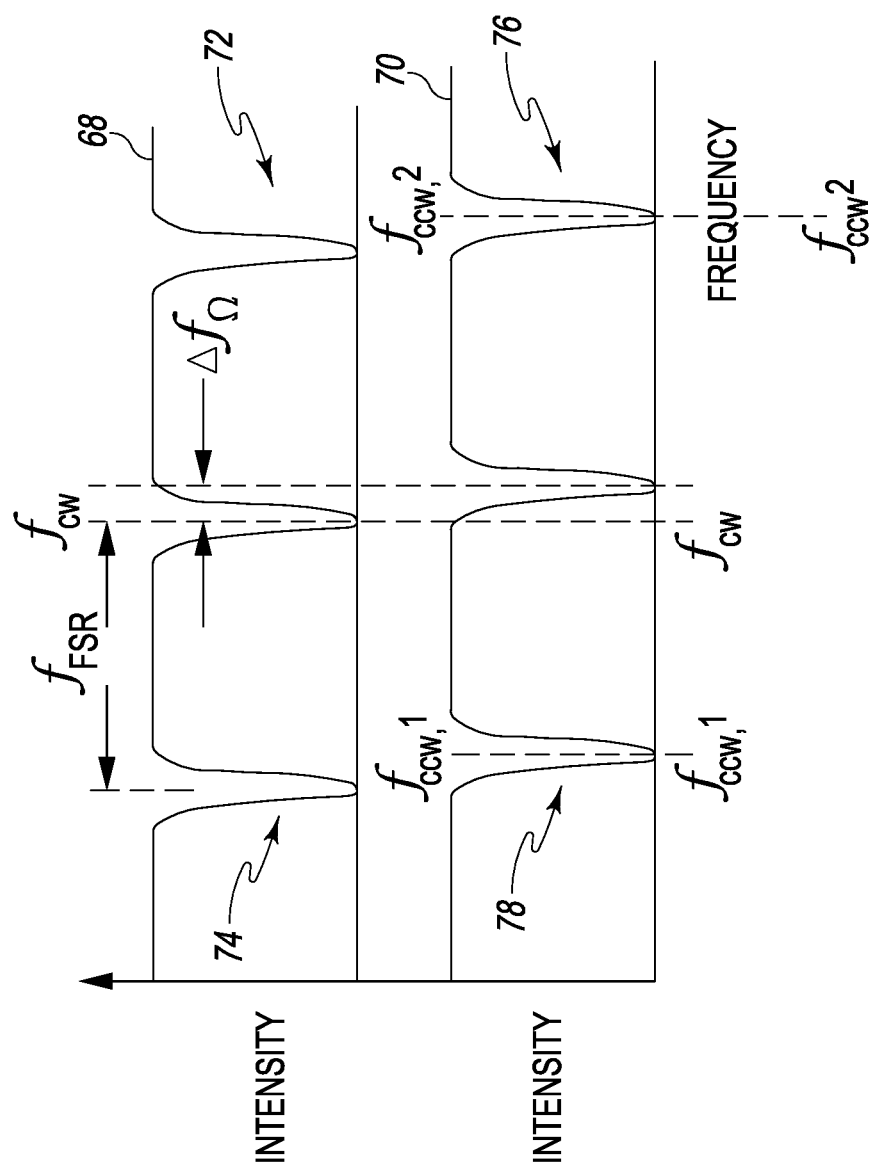
FIG. 3 is a graph of an exemplary clockwise intensity waveform and an exemplary counter-clockwise intensity waveform.

The performance of a typical RFOG can be limited by optical back-reflections. For example, if a portion of the CW beam back-reflects into the CCW beam, the back-reflected portion of the CW beam will be detected along with the CCW beam. Two types of errors result from the back-reflected portion of the CW beam. One type is the result of the optical interference between the back-reflected CW beam and the CCW beam. This type is referred to as the interference type. To counter the effects of the interference type of back-reflection error, the CW and CCW beams can be operated on separate resonance modes, as shown in FIG. 3. In particular, FIG. 3 is a graph of an exemplary clockwise intensity waveform (CW) 68 and an exemplary counter-clockwise intensity waveform (CCW) 70. When the CW beam is tuned to the resonance frequency of the CW direction of the resonator, the CW intensity waveform 68 is observed having resonance dips 72, 74 occurring at different longitudinal resonance modes. Similarly, when the CCW beam is tuned to the resonance frequency of the CCW direction of the resonator, the CCW intensity waveform 70 is observed having resonance dips 76, 78 occurring at different longitudinal resonance modes. The centers of these resonance dips 72, 74, 76, 78 indicate resonance frequencies at different longitudinal resonance modes for CW and CCW directions. The frequency spacing between adjacent modes is the free spectral range, $f_{FSR}$.

In this way the interference error between the two beams will occur at a frequency equal to the frequency separation of the two resonance modes. The frequency separation is significantly higher than the measurement frequency band of the system and therefore the interference error can be filtered out without impacting system performance. The other type of error is referred to as the intensity type and is not removed by frequency separation between the CW and CCW beams.

The back-reflected CW beam will also carry an intensity signal due to the frequency modulation of the CW beam over the CW resonance lineshape. If both CW and CCW beams are modulated at the same frequency, the intensity signal of the back-reflected CW beam will be detected along with the primary signal of the CCW beam and result in a rotation sensing error in a conventional RFOG. However, the RFOG 102 described herein is configured to discriminate between primary and back-reflected signals. Thus, the RFOG 102 is configured for improved error correction of rotation sensing errors as described above.

Figure 2:
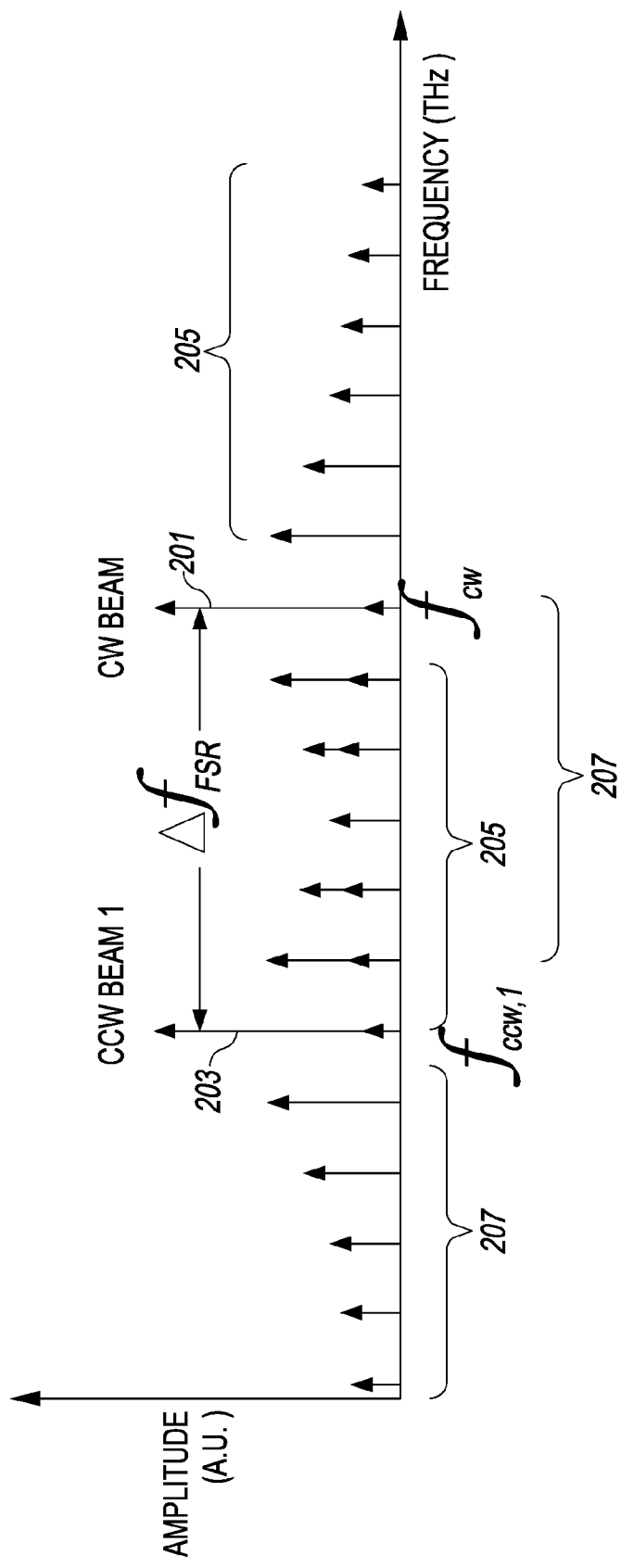
FIG. 2 is an exemplary graph of intensity modulated signals and the corresponding harmonics.

For example, the RFOG 102 includes a modulation circuit 110 coupled between a light source 116 and an input of a resonator 112. Intensity modulation of the resonator input beams at different frequencies enables discrimination between primary resonator output signals and back-reflected signals. However, using intensity modulation together with the frequency separation as shown in FIG. 3, results in additional potential errors not identified or accounted for in conventional RFOG systems. In particular, due to harmonic distortion associated with the intensity modulation process, the energy of the CW and CCW beams is spread over many harmonics that are separated by the intensity modulation frequency, as shown in FIG. 2. One source of the distortion is the fact that some intensity modulators are based on optical interference, such as a Mach-Zehnder interferometer, which has a raised cosine transfer function between applied voltage and output optical intensity. There are other sources of distortion including non-linearity of the intensity modulator drive electronics. If a significant amount of back-reflected CW energy overlaps in frequency a significant portion of energy of the CCW beam, then an interference-type error will be generated.

This type of error can be reduced by making the frequency of the intensity modulation different for the CW and CCW beams. However, under certain rotations rates that shift the CW and CCW resonance frequencies differently, an overlap of some harmonics of the CW and CCW beams will occur. For example, during rotation, the CW and CCW resonance frequencies will shift in opposite directions, thus shifting the relationship between the harmonics of the CW and CCW beams. Although the frequency of the intensity modulation can be selected so that no overlap of harmonics occurs at zero rotation (e.g. by setting the frequency of the intensity modulation so that it is not an integer divisor of the free spectral range), rotation of the RFOG may cause overlap due to frequency shift.

Thus, the modulation circuit 110 is configured to output an intensity modulated signal having harmonics with amplitudes below a determined threshold level. The threshold level is determined such that harmonic signals having amplitudes below the threshold level have a negligible effect on counter propagating signals at the same frequency in the presence of optical backscatter. In some embodiments, the frequency of the intensity modulation in the modulation circuit 110 is sufficiently separated from the frequency of the free spectral range or a multiple of the free spectral range frequency. In one example embodiment, the free spectral range frequency is 20 MHz and the maximum frequency shift during rotation is determined to be 600 KHz. In such an embodiment, the frequency of the intensity modulation is configured to be more than 600 KHz away from the frequency of the free spectral range. Due to the selection of the separation distance, only higher order harmonics having lower amplitudes potentially overlap the primary wave of the counter propagating signal. Thus, the amplitude of any harmonic that overlaps the primary wave of the counter propagating signal is less than the threshold level and has a negligible effect.

For example, as shown in FIG. 2, the intensity modulated clockwise (CW) signal 201 produces a plurality of harmonics 205. Similarly, the counter clockwise (CCW) signal 203 produces a plurality of harmonics 207. One of the harmonics 205 overlaps the primary wave of the CCW signal 203 in the example shown in FIG. 2. As stated above, the harmonics of the intensity modulated signal output from the modulation circuit 110 that overlap the primary wave of the counter propagating signal have a negligible amplitude. For example, in some embodiments, the frequency of the intensity modulation is separated sufficiently from the frequency of the free spectral range ($f_{FSR}$) that any overlapping harmonic has an amplitude below the predetermined threshold. The free spectral range is defined as the frequency spacing between adjacent resonance modes. The adjacent resonance modes are described above with respect to FIG. 3.

In other embodiments, the modulation circuit 110 is configured to improve the linearity of the output of the modulation circuit 110, as described in more detail below with respect to FIGS. 4A and 4B. By improving the linearity, the amplitude of any harmonics decreases such that the amplitude of the harmonics which overlap the frequency of the primary wave of the counter propagating signal is below the threshold.

The resonator 112 is configured to further modulate the counter propagating intensity modulated signals via common cavity length modulation, as described in more detail below. The resonance tracking electronics 114 is configured to reject unwanted intensity signal due to backscatter based on the common cavity modulation and the intensity modulation via modulation circuit 110, as described in more detail below.

Figure 4A:
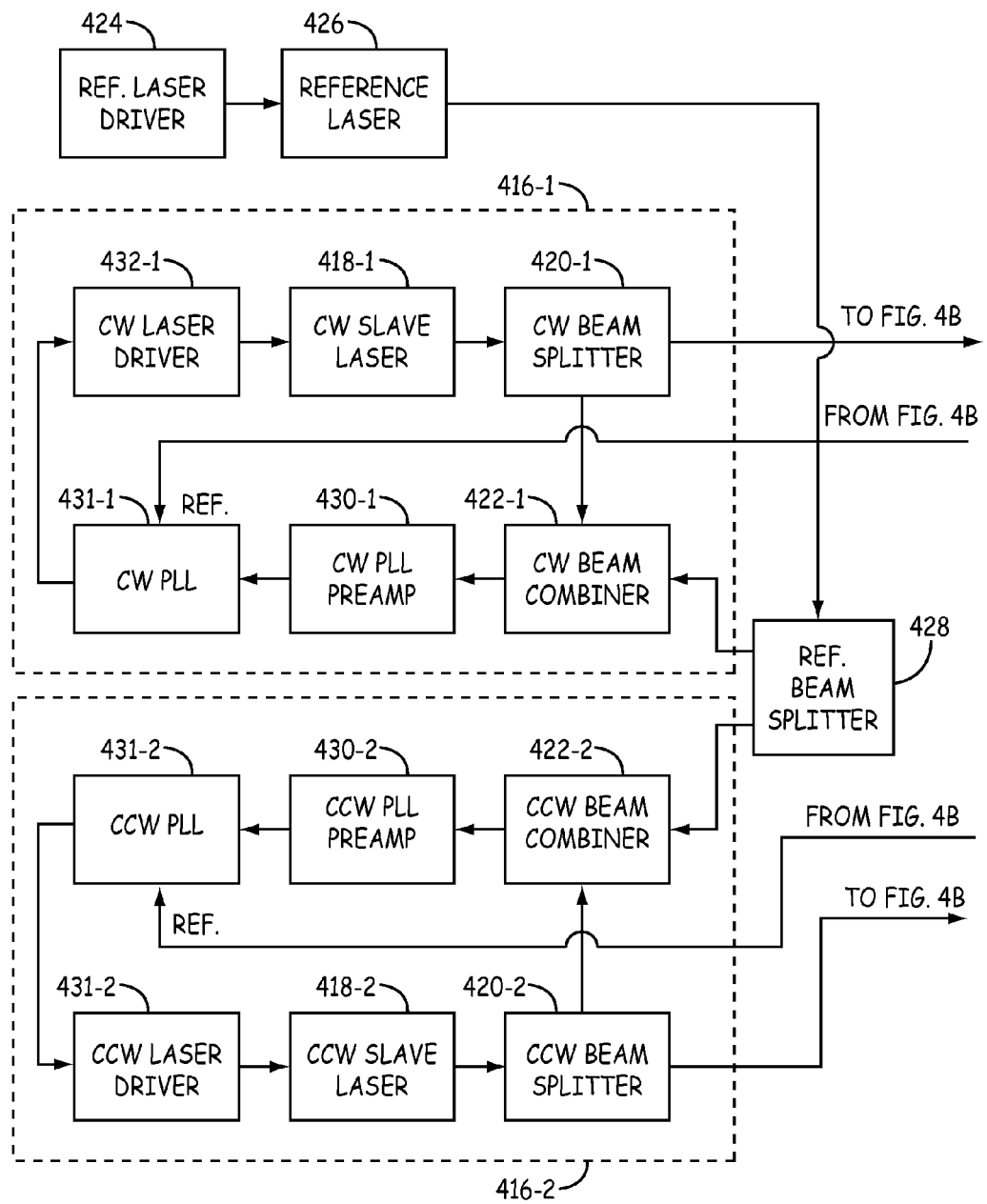
FIGS. 4A and 4B are block diagrams of an exemplary embodiment of a resonator fiber optic gyroscope.
Figure 4B:
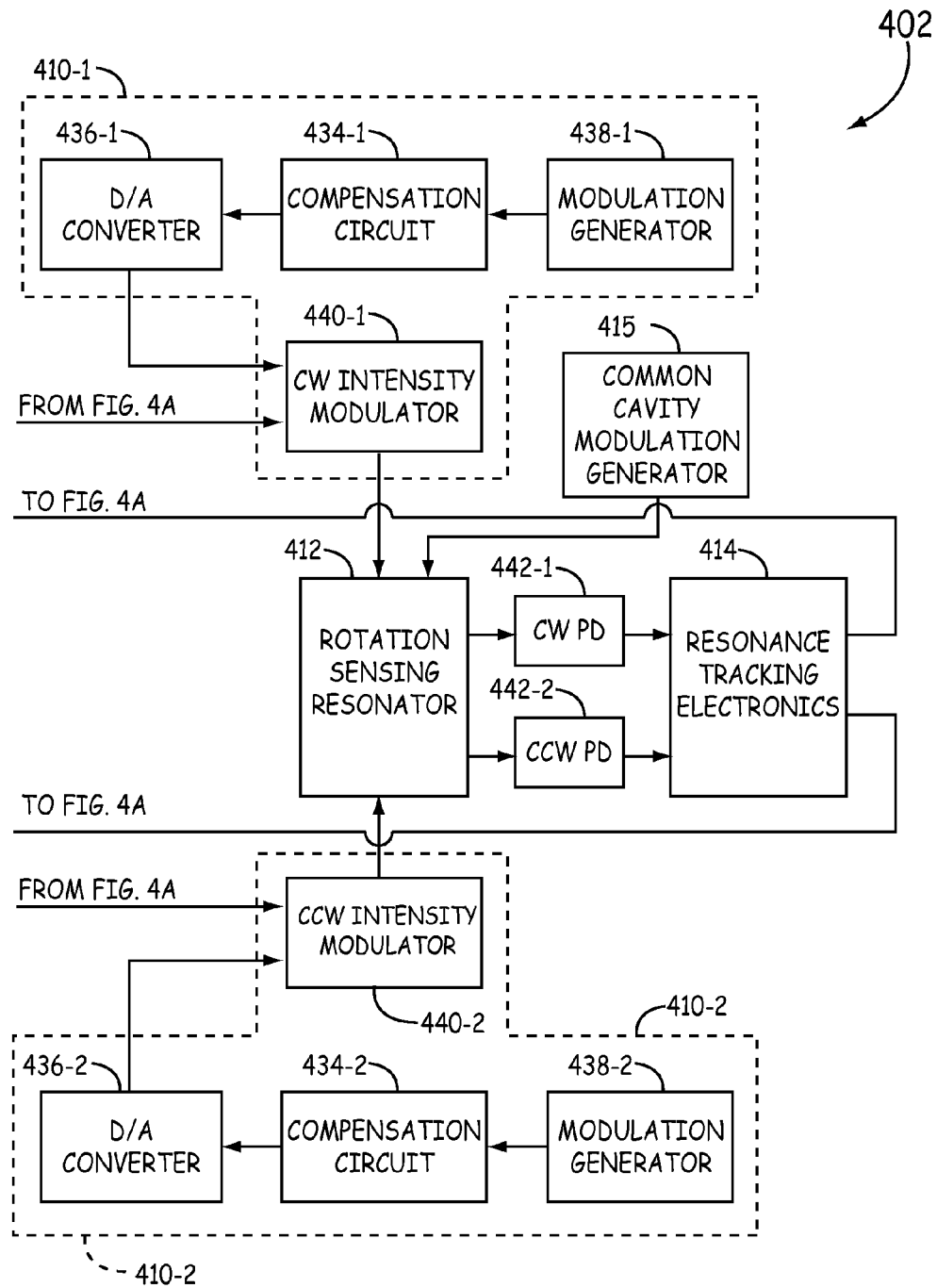

FIGS. 4A and 4B are block diagrams of one exemplary embodiment of a resonator fiber optic gyroscope 402 that includes an intensity modulation circuit 410-1 and 410-2 between each input of a rotation sensing resonator 412 and the respective light source 416-1 and 416-2. In particular, as shown in FIGS. 4A and 4B, RFOG 402 includes a clockwise (CW) intensity modulation circuit 410-1 coupled between light source 416-1 and a first input of the resonator 412. Similarly, RFOG 402 includes a counter-clockwise (CCW) intensity modulation circuit 410-2 coupled between the light source 416-2 and a second input of the resonator 412.

Each of the intensity modulation circuits 410-1 and 410-2 in this embodiment includes a respective modulation signal generator 438, compensation circuit 434, and intensity modulator 440. In addition, in the embodiment shown in FIGS. 4A and 4B, the compensation circuit 434 is implemented as a digital modulation circuit. Consequently, each of the intensity modulation circuits 410-1 and 410-2 includes a respective digital to analog converter 436 in this embodiment. However, it is to be understood that, in embodiments implementing the intensity modulation circuits 410 with only analog circuitry, the digital to analog converter 436 is not included.

The first laser source 416-1 outputs a frequency modulated laser beam that propagates in a clockwise direction through the resonator 412, also referred to as a CW laser beam. Similarly, the second laser source 416-2 outputs a frequency modulated laser beam that propagates in a counter clockwise direction through the resonator 412, also referred to a CCW laser beam. As used herein, the terms "laser beam", "light wave", and "light" are used interchangeably. Similarly, the terms "laser source" and "light source" are used interchangeably herein.

In this embodiment, the first laser source 416-1 comprises a CW slave laser 418-1 and CW beam splitter 420-1. The CW beam splitter 420-1 splits light from the CW laser 418-1 into two beams. One laser beam is output from the first light laser 416-1 and the other goes to a CW beam combiner 422-1. The CW beam combiner 422-1 combines the CW beam with a component of a reference laser beam. In particular, the exemplary RFOG 402 includes a reference laser driver 424 which drives a reference laser 426. The reference laser 426 produces a reference laser beam which is split into two beams by a reference beam splitter 428. One output of the reference beam splitter 428 goes to the CW beam combiner 422-1 and the other output of the reference beam splitter 428 goes to a CCW beam combiner 422-2 in the second laser source 416-2.

The CW beam combiner 422-1 optically mixes the CW laser beam with the reference laser beam from the reference beam splitter 428. The optical mixing creates an intensity signal at the output of the CW beam combiner 422-1. The frequency of the intensity signal is the beat frequency between the CW and reference laser beams. The intensity signal is converted to an electrical signal by a CW phase-lock-loop (PLL) preamplifier (preamp) 430-1. The electrical signal is input into a CW PLL 431-1. The CW PLL 431-1 locks the CW slave laser 418-1 to the reference laser 426 with a frequency offset determined by a reference frequency $\Delta f_{cw}$, which is electronically generated by the resonance tracking electronics 414. The CW PLL 431-1 controls the CW laser frequency via the CW laser driver 432-1 to maintain the beat signal between the CW and reference lasers at the reference frequency $\Delta f_{cw}$.

The CW beam that is output from the first laser source 416-1 is locked onto a resonance frequency of the resonator 412. To determine the center of the resonator CW resonance frequency, the resonance frequency of the resonator 412 is modulated using common cavity length modulation in the resonator 412 based on a signal received from a common cavity signal generator 415. Common cavity length modulation can be performed, for example, by a piezoelectric tube wrapped with resonator fiber, or a piezoelectric element placed on a resonator mirror. The resonator fiber is modulated so that the counter propagating beams see the same modulation and modulation errors.

By using common cavity modulation the RFOG 402 reduces rotation sensing errors due to modulator imperfections. By using the same modulator, the resonance detection errors are the same for both the CW and CCW directions. Since the rotation measurement is the difference between the detected CW and CCW resonance frequencies, a common error will cancel out (common mode rejection) in the rotation measurement.

Due to the modulation, the CW output of the sensing resonator 412 is a signal that is indicative of the frequency difference between the CW laser beam frequency and the center frequency of the CW resonance frequency. The signal at the modulation frequency will pass through zero amplitude when the CW laser beam frequency is at the resonance frequency. The resonance tracking electronics 414 demodulates the resonator CW output signal at the modulation frequency and generates a control signal, $\Delta f_{cw}$, that indicates when the CW laser is off resonance. The control signal is used to lock the CW laser 418-1 to the resonance frequency. The CW resonance tracking electronics 414 outputs the control signal $\Delta f_{cw}$ to the CW PLL 431-1 to be used as a reference frequency. The resonance tracking electronics 414 maintains the CW laser frequency at the CW resonance frequency by controlling the reference frequency $\Delta f_{cw}$.

The RFOG 402 is configured to reduce or eliminate rotation sensing errors due to modulator imperfections and backscatter. For example, due to the common cavity modulation, the RFOG 402 is sensitive to optical back-reflection or backscatter within the resonator. In particular, backscattered light can result in intensity-type error in which the intensity of a backscattered wave is modulated by the modulation over the resonance dip just like the primary wave. By placing intensity modulation circuits 410-1 and 410-2 before resonator 412, the CW and CCW signals are modulated to place a signature on the resonator output light waves that allows the resonance tracking electronics 414 to reject the signals and errors due to the backscatter light. In particular, the intensity modulation circuits 410-1 and 410-2 modulate the intensity of the light beams with an intensity that varies at a specific frequency. The frequency of the intensity modulation is determined by a signal generated by a respective modulation signal generator 438. In addition, the frequency of the intensity modulation is not harmonically related to the frequency of the common cavity modulation in the resonator 412.

In addition, to reduce backscatter errors, each of the intensity modulation circuits 410-1 and 410-2 includes a respective compensation circuit 434 in this embodiment. For example, backscatter errors can be caused by harmonics that overlap the primary wave of a counter propagating signal as described above. For example, in some embodiments the modulator 440 is implemented as a Mach-Zehnder type modulator having a raised-cosine transfer function. For a typical Mach-Zehnder modulator, an electrical sine-wave is applied from the modulation signal generator 438 to the modulator 440 in order to modulate the light. However, this will result in the generation of many harmonics.

In this embodiment, a sine-wave is input to a compensation circuit 434 which pre-distorts the sine-wave using an arc-cosine function to improve the linearity of the output of intensity modulator 440. However, it is to be understood that in other embodiments, other modulation circuits 410 are used. For example, in some embodiments, the modulation signal generator 438 applies a triangle-wave voltage resulting in an intensity modulator peak to peak phase amplitude close to $2*\pi$ to the modulator 440. Thus, by inputting a triangle-wave signal having an amplitude near $2*\pi$ into the intensity modulator 440, the harmonic distortion of the resulting intensity modulation is reduced. The reduction of the intensity modulation harmonics above the fundamental modulation frequency depends on how close the amplitude of the triangle-wave is set to $2*\pi$ in optical phase difference of the intensity modulator. In some such embodiments, the compensation circuit 434 is omitted.

Exemplary modulation circuits which can be implemented in various embodiments are described in more detail below with respect to FIGS. 8-10. Furthermore, although a Mach-Zehnder type modulator is described in this exemplary embodiment, it is to be understood that other modulators can be used in other embodiments. In some such embodiments implementing other types of modulators, a compensation circuit 434 is used. The distortion introduced by the compensation circuit 434 is dependent on the type of modulator implemented as intensity modulator 440. In particular, the distortion is selected to compensate for the non-linearity in the transfer function of the modulator 440.

The resonance tracking electronics 414 is configured to detect the resonance output signals at the sum and difference frequencies. For example, a double demodulation technique can be employed in the resonance tracking electronics 414 to discriminate between resonator output signals and unwanted noise. Exemplary resonance tracking electronics 414 is described in more detail with respect to FIG. 9.

The second laser source 416-2 is configured similar to the first laser source 416-1 and provides a laser beam that propagates in a counter clockwise direction through the resonator 412, also referred to as the CCW laser beam. The CCW laser beam is controlled in a manner similar to the CW laser beam discussed above, but to have a beat frequency $\Delta f_{cw}$ with the reference laser frequency. Rotation rate is derived from taking the difference between the magnitudes of the two beat frequencies $\Delta f_{cw}$ and $\Delta f_{ccw}$.

As discussed above, the resonance frequency of the CCW direction is associated with a different longitudinal resonance mode (e.g., at a resonance frequency that is at least one longitudinal resonance mode away than the resonance frequency of the CW direction). In some embodiments, the CCW beam is switched between a CCW resonance frequency that is at least one longitudinal resonance mode lower than the resonance frequency of the CW direction and a CCW resonance frequency that is at least one longitudinal resonance mode higher than the resonance frequency of the CW direction. The CCW beam is switched to remove a bias and associated bias instabilities (e.g., due to the FSR being part of the measurement).

Figure 5:
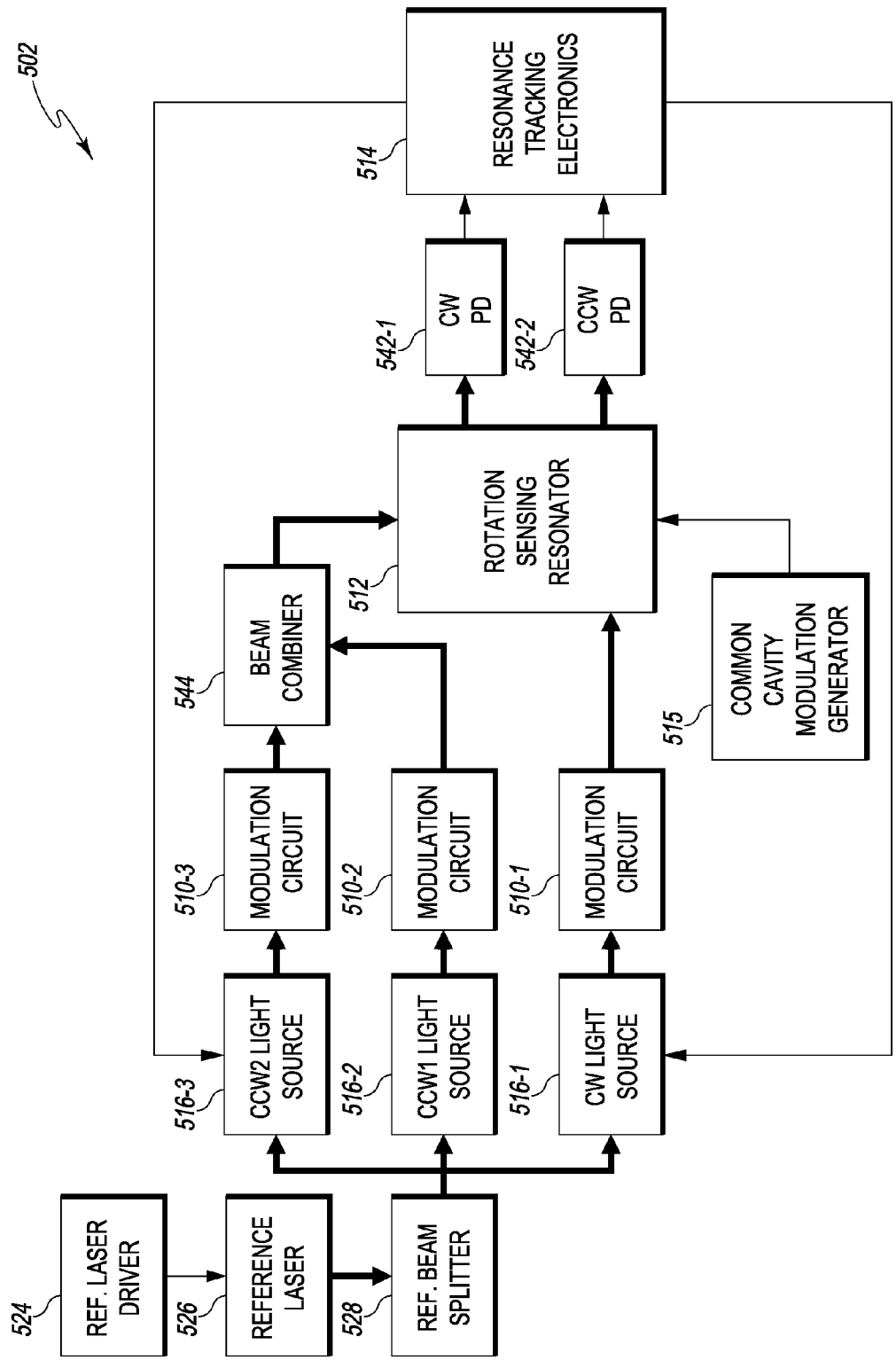
FIG. 5 is a block diagram of another exemplary embodiment of a resonator fiber optic gyroscope.

In other embodiments, three slave lasers are used, as shown in FIG. 5. The components of RFOG 502 are similar to the components in RFOG 402 described above. However, RFOG 502 includes three light sources 516-1, 516-2, and 516-3. A reference light beam is split by reference beam splitter 528 and provided to each of light sources 516-1, 516-2, and 516-3. Light source 516-1 provides a clockwise signal similar to light source 416-1 described above. Each of light sources 516-2 and 516-3 provides a counter clockwise signal that are combined in beam combiner 544.

In particular, the slave light sources 516-1, 516-2, and 516-3 are phase locked to the reference laser 526 with independent controllable frequency offsets for each slave laser. The frequency (fr) of the reference laser 526 is set such that the beat frequencies between the slave light sources 516-1, 516-2, 516-3 and the reference laser 526 are within normal operating limits of the gyro electronics while the slave light sources 516-1, 516-2, 516-3 are locked to the resonator 512. In particular, as shown in FIG. 3, the first slave light source 516-1 is tuned to a CW resonance frequency $f_{cw}$ or $f_1$, the second slave light source 516-2 is tuned to a first CCW resonance frequency, $f_{ccw,1}$ or $f_2$, that is one longitudinal mode lower than the CW resonance frequency $f_{cw}$ at zero rotation rate of the RFOG 502, and the third slave light source 516-3 is tuned to a second CCW resonance frequency, $f_{ccw,2}$ or $f_3$, that is one longitudinal mode higher than the CW resonance frequency $f_{cw}$ at zero rotation rate of the RFOG 502.

In one example, the reference frequency, $f_r$, is set to be higher than the frequencies of the slave light sources 516-1, 516-2, 516-3. In this example the slave beat frequencies for slave light sources 516-1, 516-2, 516-3 respectively are: $\Delta f_1 = f_r - f_1$, $\Delta f_2 = f_r - f_2$, and $\Delta f_3 = f_r - f_3$. The gyro data $\Delta f_1$, $\Delta f_2$ and $\Delta f_3$ can be used to make the calculation $(\Delta f_1 - \Delta f_3) - (\Delta f_2 - \Delta f_1) = 2\Delta f\Omega$, where $\Delta f\Omega$ is proportional to rotation rate, $\Delta f_1 - \Delta f_3 = f_{FSR} + \Delta f\Omega$, and $\Delta f_2 - \Delta f_1 = f_{FSR} - \Delta f\Omega$. Thus, a rotation measurement is obtained without FSR and any associated bias and bias instability.

Figure 6:
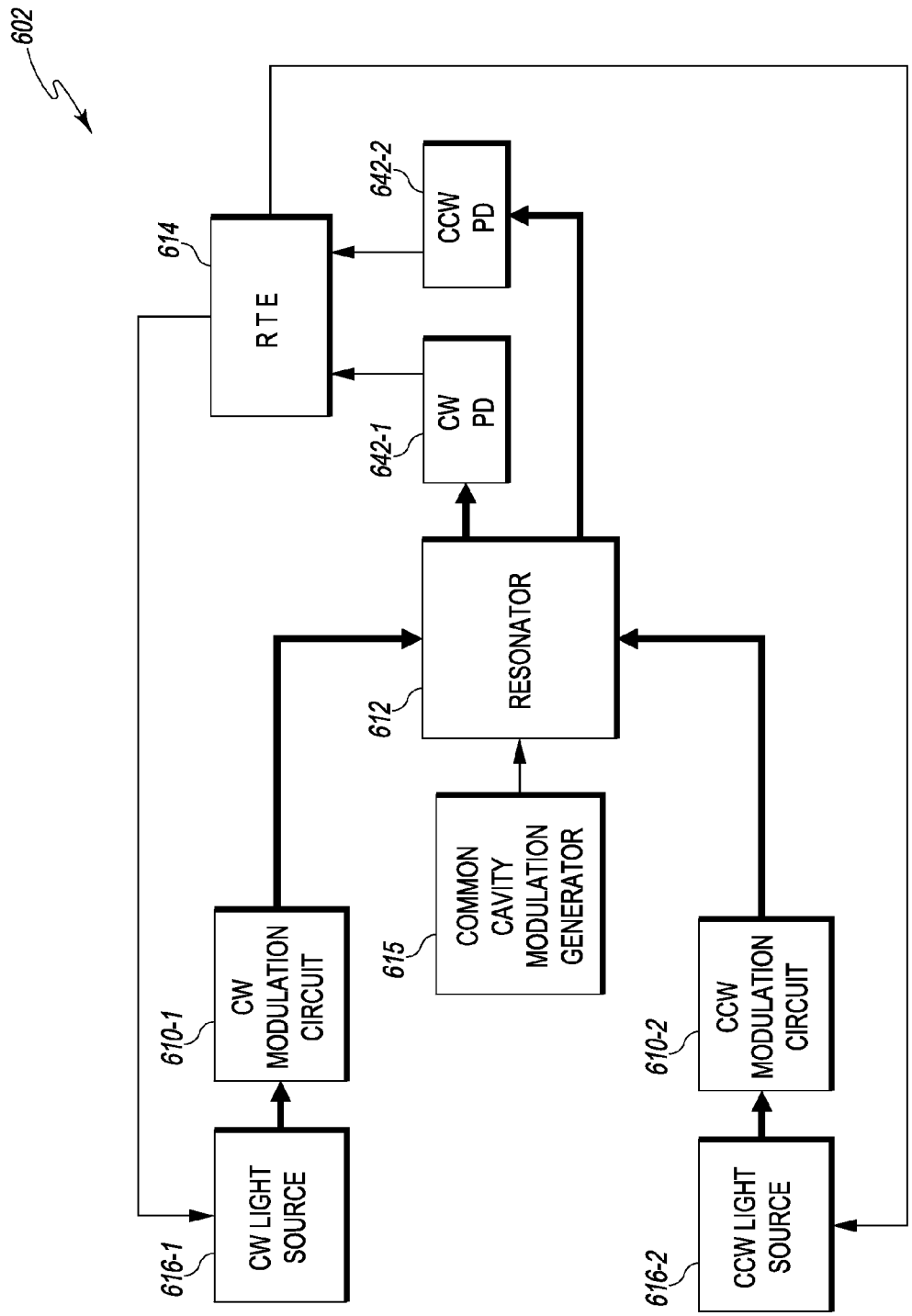
FIG. 6 is a block diagram of another exemplary embodiment of a resonator fiber optic gyroscope.

In other embodiments, a reference laser is not used, such as shown in FIG. 6. In particular, the exemplary RFOG 602 shown in FIG. 6 includes two light sources 616-1 and 616-2. Each of light sources 616-1 and 616-2 operates similarly to light sources 416-1 and 416-2 except that light sources 616-1 and 616-2 are not locked to a reference laser. The other components of RFOG 602, such as modulation circuits 610-1 and 610-2, operate similarly to corresponding components described above with respect to FIGS. 4A and 4B.

Figure 7:
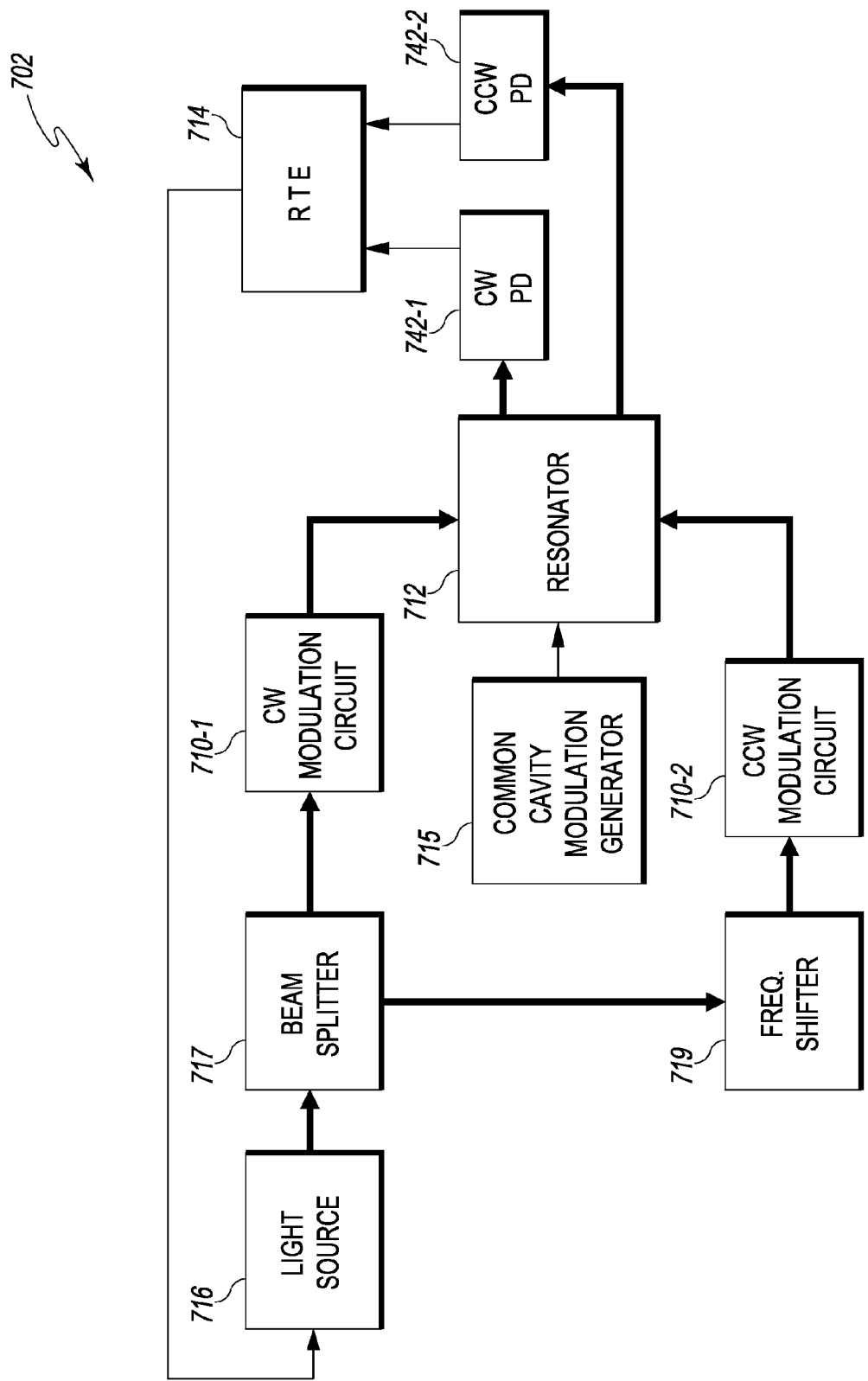
FIG. 7 is a block diagram of another exemplary embodiment of a resonator fiber optic gyroscope.

In yet another embodiment, only one light source is used, such as is shown in FIG. 7. In FIG. 7 the single light source 716 generates a light beam similar to light source 416-1 described above. However, light source 716 is not locked to a reference laser. In addition, the light beam generated by light source 716 is split by beam splitter 717. A portion of the light beam is provided to a clockwise modulation circuit 710-1 and a portion of the light beam is provided to a frequency shifter 719. The frequency shifter shifts the frequency of the received portion of the light beam. The frequency shifted light beam is then output to a counter clockwise modulation circuit 710-2. Each of the modulation circuits 710-1 and 710-2 operate similarly to modulation circuits 410-1 and 410-2 described above to provide a signal for which the amplitude of harmonics overlapping the counter propagating signal is below a threshold and can be neglected. The other components of RFOG 702, such as resonator 712 and resonator tracking electronics 714, operate similarly to corresponding components in RFOG 402 described above.

Figure 8:
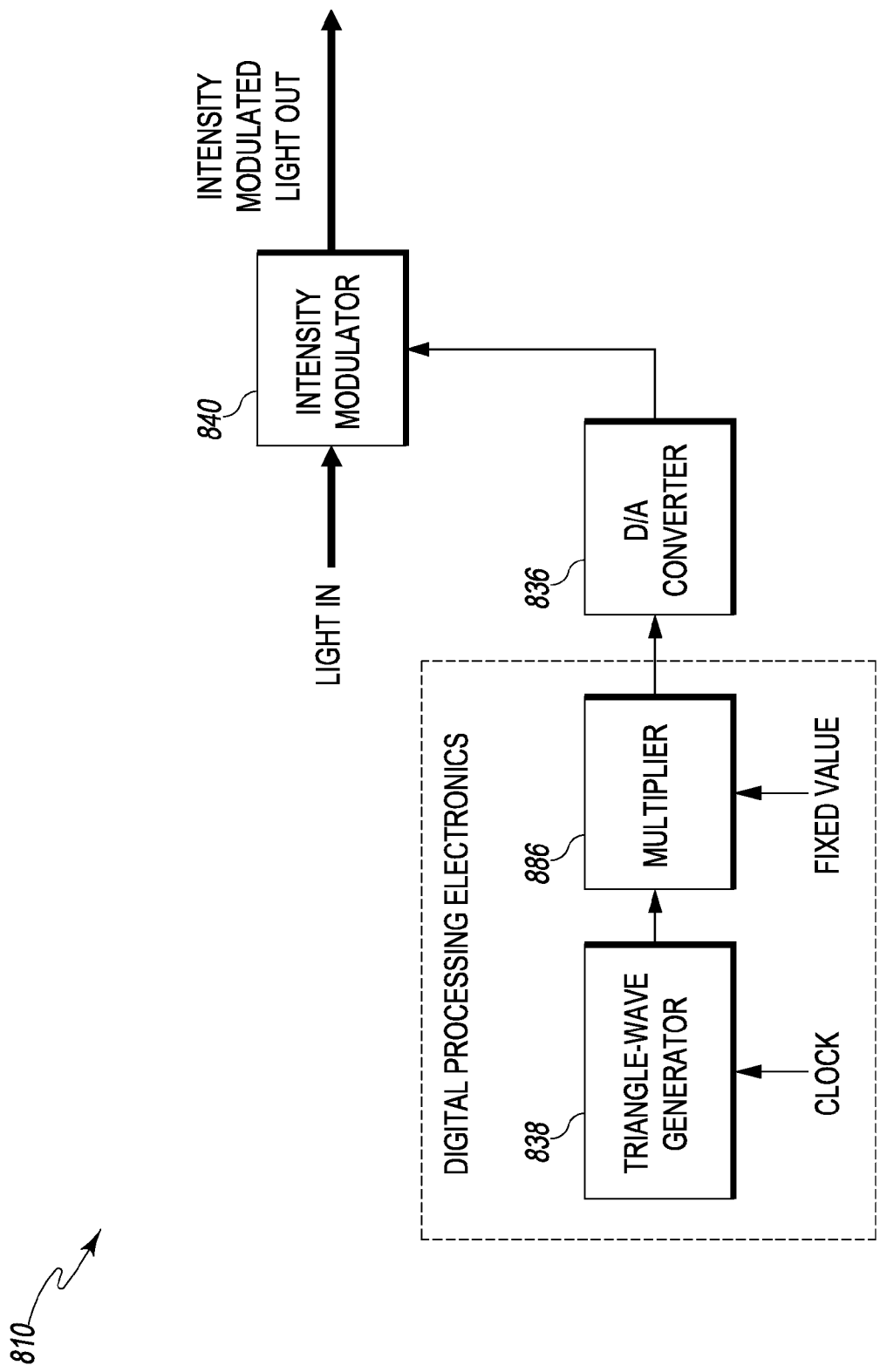
FIG. 8 is a block diagram of an embodiment of an exemplary modulation circuit.

FIG. 8 is a block diagram of one embodiment of an exemplary modulation circuit 810 for use in the gyroscopes described above. The exemplary modulation circuit 810 includes an intensity modulator 840. In this embodiment, the intensity modulator 840 is implemented as a Mach-Zehnder type intensity modulator. The modulation circuit 810 also includes a modulation generator 838 and a multiplier 886 that are implemented, in this embodiment, as digital electronic circuits. Hence, the output of the multiplier 886 is passed through a digital to analog (D/A) converter 836 before being applied to the intensity modulator 840.

In this embodiment, the modulation generator 838 generates a triangle wave. The amplitude of the triangle wave is partially determined by multiplying the output of the triangle-wave generator by a fixed multiplier value in the multiplier 886. The fixed multiplier value is set such that the triangle-wave modulation results in a 2*π peak-to-peak phase difference modulation of the two lightwaves within the Mach-Zehnder type intensity modulator 840. If the triangle wave is a perfect triangle wave in optical phase having a 2*π peak-to-peak amplitude and identical linear positive and negative slopes, the intensity modulator 840 will only generate an intensity modulation at the fundamental frequency of the triangle wave and there will be no higher harmonics. Stated another way, since the amplitude of the higher order harmonics is zero, each of the higher order harmonics has an amplitude below the threshold, as described above. Small deviations away from 2*π peak-to-peak amplitude will result in intensity modulation at higher harmonics. However, small deviations away from 2*π peak-to-peak amplitude can be tolerated as long as the harmonics have an amplitude less than the threshold level as described above.

One method of generating a triangle wave is to use an up/down counter. The up/down counter is allowed to count up clock pulses until its output reaches some specified terminal count value. Upon reaching the terminal count value the counter operation is switched to count down the number of clock pulses until its output reaches zero, where the counting operation is switched back to up counting. As long as the clock pulse occurs at a constant frequency, the positive and negative slopes of the triangle wave ramps will be approximately equal.

Figure 9:
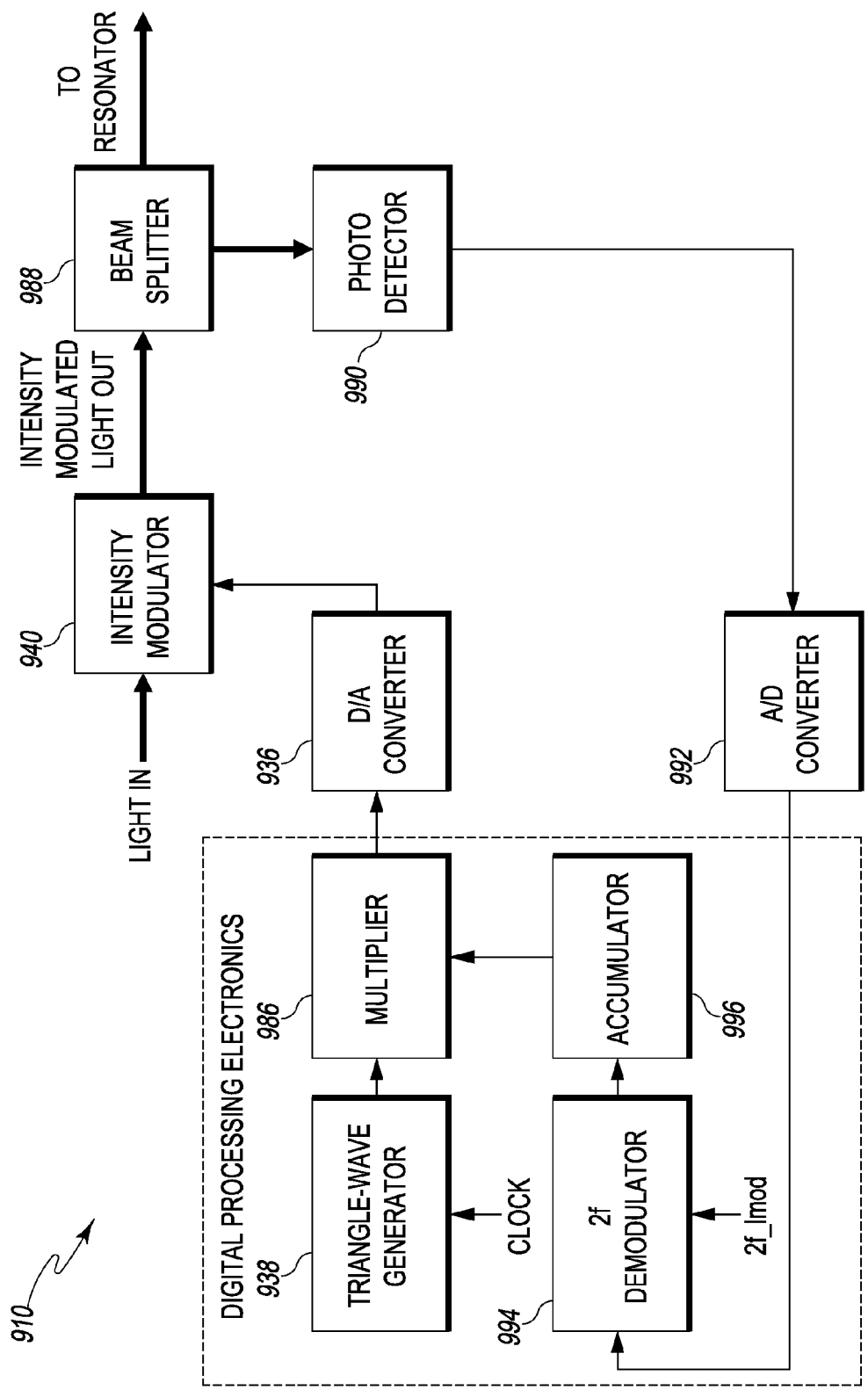
FIG. 9 is a block diagram of another embodiment of an exemplary modulation circuit.

FIG. 9 is a block diagram of another embodiment of a modulation circuit 910. The intensity modulator 940 in modulation circuit 910 is also implemented using a Mach-Zehnder type modulator in this example. In addition, the modulation generator 938 is configured to output a triangle wave. Since a deviation away from a phase difference amplitude of 2*π peak-to-peak results in the generation of higher harmonics in the intensity modulator 940, the triangle wave voltage amplitude could drift over time. To detect deviation from the desired amplitude, a beam splitter 988 is placed after the intensity modulator 940 to split a small fraction of light to a photo detector 990. The photo-detector signal goes to an analog to digital (A/D) converter 992 where it is digitized then sent to a demodulator 994 that demodulates the signal at twice the fundamental frequency of the intensity modulation. Therefore the 2f demodulator 994 detects how much second harmonic intensity modulation the intensity modulator 940 is generating, which is an indication of the triangle wave amplitude deviating from the desired amplitude. An accumulator 996 controls the multiplier value input to the multiplier 986 based on an output from the demodulator 994. Therefore, the accumulator 996 adjusts the multiplier value input into the multiplier 986 until the amplitude of the triangle wave output from the multiplier 986 to the intensity modulator 940 reaches the desired amplitude. The photo detector 990, A/D converter 992, 2f demodulator 994 and accumulator 996 form a feedback loop that automatically corrects for changes to the desired triangle wave amplitude. In addition, as shown in FIG. 9, the modulation generator 938, multiplier 986, demodulator 994, and accumulator 996 are implemented using digital electronics. However, it is to be understood that analog circuits can be used in other embodiments. In such embodiments, the D/A converter 938 and A/D converter 992 are omitted.

Figure 10:
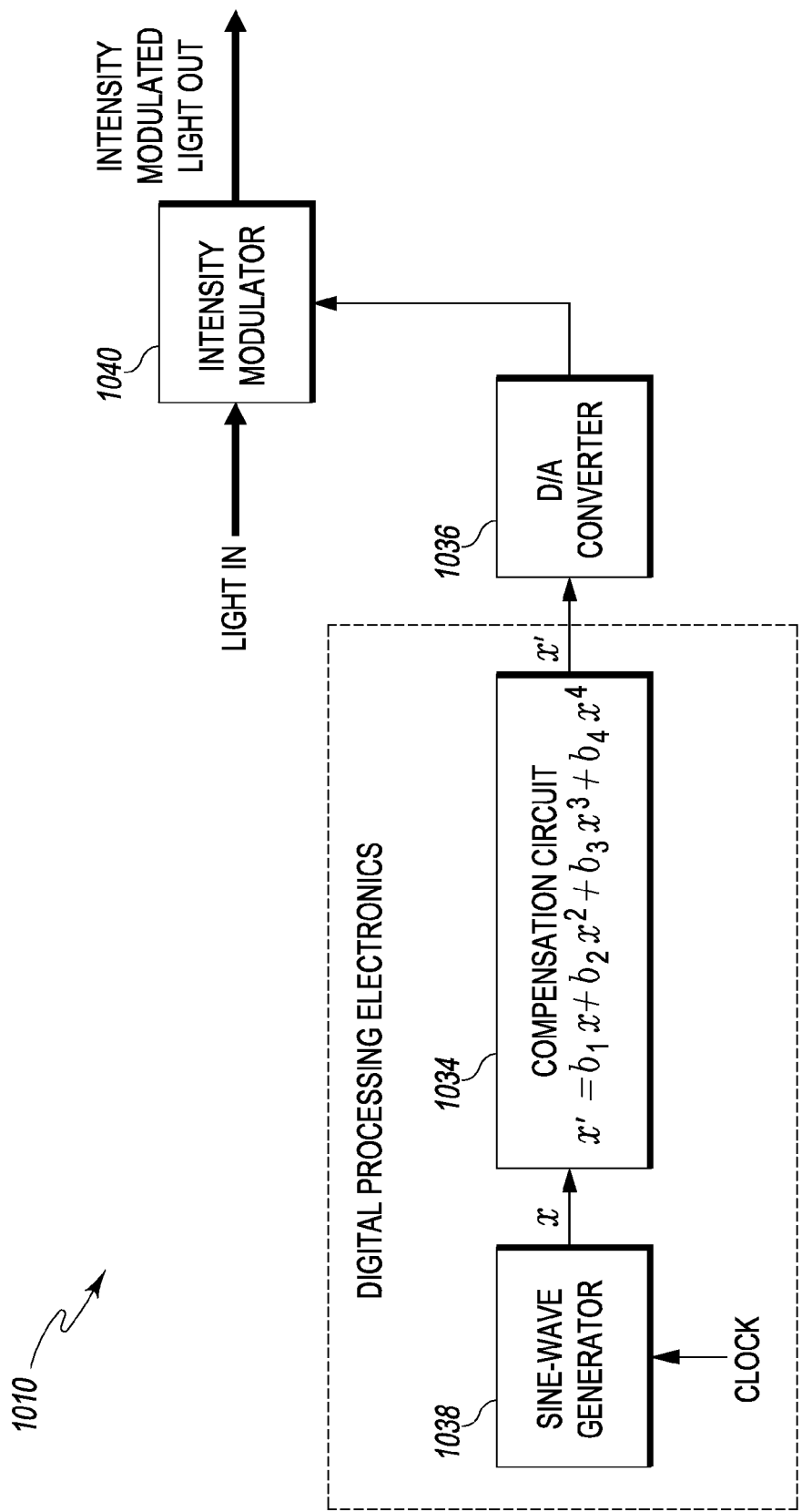
FIG. 10 is a block diagram of another embodiment of an exemplary modulation circuit.

FIG. 10 is a block diagram depicting another example of a modulation circuit 1010. The modulation circuit 1010 includes a compensation circuit 1034 used to correct for intensity modulator non-linearity. Some intensity modulators, such as the Mach-Zehnder type modulator, rely on optical interference to control the intensity of a light beam. However, there are other types of intensity modulators that do not rely on optical interference to control the intensity of a light beam and, thus, do not have a raised cosine relationship between drive voltage and output intensity. Such modulators also often have some non-linearity which results in harmonic distortion of the intensity modulation.

The modulation circuit 1010 includes digital processing electronics that incorporate a sine-wave modulation generator 1038 and a digital compensation circuit 1034. One example of the compensator function of the compensation circuit 1034 is to pass the output of the modulation generator 1038 through a polynomial function, such as the exemplary polynomial function shown in FIG. 10. The coefficients of the polynomial are adjusted and set such that the distortion the compensation circuit 1034 creates cancels out the distortion created by the intensity modulator 1040. In other words, the coefficients are set such that the net transfer function from the sine-wave generator output to the intensity modulator output is linear.

Figure 11:
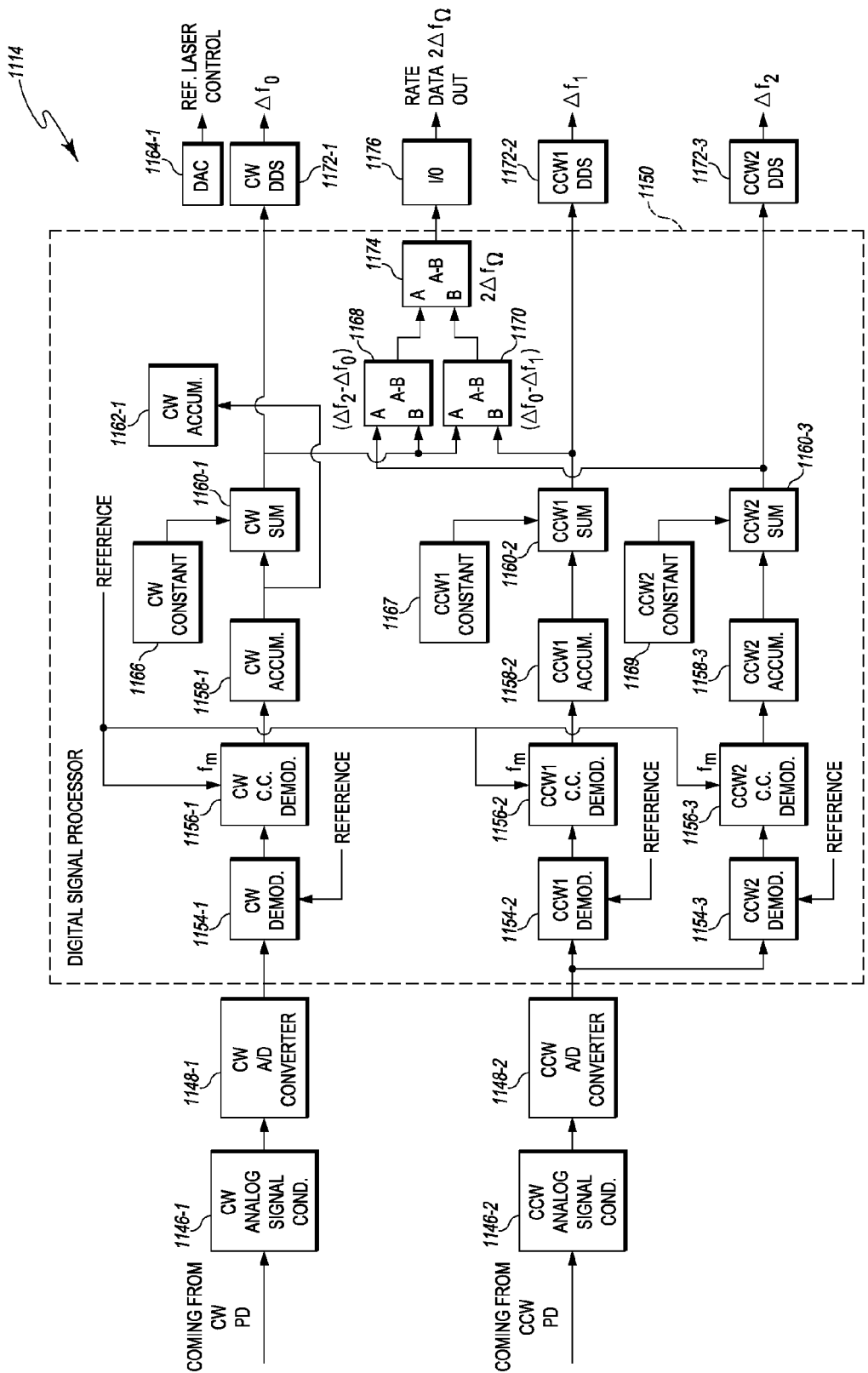
FIG. 11 is a block diagram of one embodiment of exemplary resonance tracking electronics.

FIG. 11 is a block diagram of one embodiment of exemplary resonance tracking electronics (RTE) 1114 for use in the RFOGs described above. Resonance tracking electronics 1114 comprises a digital signal processor 1150, a CW analog signal conditioner 1146-1, a CW analog-to-digital converter 1148-1, a CCW analog signal conditioner 1146-2, and a CCW analog-to-digital converter 1148-2. The CW analog signal conditioner 1146-1 and the CCW analog signal conditioner 1146-2 both provide signal conditioning on the output from the respective photodiode, such as CW photodiode 442-1 or CCW photodiode 442-2 shown in FIGS. 4A and 4B. For example, the CW analog signal conditioner 1146-1 and the CCW analog signal conditioner 1146-2 may include filtering of unwanted signals to allow further analog gain without saturating electronics and anti-aliasing filtering before being digitalized by the respective analog-to-digital converter 1148-1 and 1148-2.

In another embodiment, there is an intermediate frequency (IF) stage, where the output of the photodiodes (e.g. CW photodiode 442-1 or CCW photodiode 442-2) is down converted to an intermediate frequency before being digitalized by the respective analog to digital converter. In one implementation, the down conversion occurs in the CW analog signal conditioner 1146-1 and the CCW analog signal conditioner 1146-2, respectively. After the analog-to-digital converters 1148-1 and 1148-2 digitalize the respective signals, the digitized signals are input to the digital signal processor 1150. The digital signal processor 1150 can be implemented, for example, as a field programmable array (FPGA) chip, an application specific integrated circuit (ASIC), or a microprocessor.

Digital signal processor 1150 processes the digital signals. In particular, the CW signal is demodulated at a CW demodulator 1154-1 using a reference signal at the frequency of the intensity modulation applied by the CW modulation circuit, e.g. modulation circuit 410-1 described above. This allows for the discrimination between rotation information and rotation-sensing errors. After the rotation-sensing errors have been discriminated or blocked by the CW demodulator 1154-1, the demodulated signal output from the CW demodulator 1154-1 is demodulated a second time at a CW common-cavity (C.C.) demodulator 1156-1. The CW C.C. demodulator 1156-1 demodulates the output of the CW demodulator 1154-1 using a reference signal at the common cavity modulation frequency, fm.

The output of the CW C.C. demodulator 1156-1 indicates whether the CW light source, e.g. light source 416-1, is on-resonance or off resonance. On-resonance refers to a particular light beam having a round trip resonator path length equal to an integral number of wavelengths. Similarly, a light beam is off-resonance when its round trip resonator path length is not equal to the same integral number of wavelengths. When all beams are approximately on-resonance, the rotational rate information can be determined. In one embodiment, if the output of the CW C.C. demodulator 1156-1 is zero, then the CW light source is on-resonance. If the output of CW C.C. demodulator 1156-1 has a non-zero value, the CW light source is off resonance. A non-zero output is a referred to as an error signal, and can be used in a control loop, as described in detail below, to adjust the light beams to on-resonance.

The output of the CW C.C. demodulator 1156-1 is integrated in a first CW accumulator 1158-1. The output of accumulator 1158-1 is coupled to a CW summer 1160-1 and to a second CW accumulator 1162-1. In embodiments, utilizing a reference laser, the second CW accumulator 1162-1 is coupled to a digital-to-analog converter 1164-1, which is used to drive the reference laser driver. In particular, the accumulator 1162-1 controls the reference laser frequency to keep all the lasers and electronics within normal operating range. For example, the accumulator 1162-1 controls the reference laser frequency to keep the time-average value of first CW accumulator 1158-1 near zero in order to prevent the beat frequencies between the reference and slave lasers from exceeding the operating range of the electronics.

The CW summer 1160-1 sums the output of the first CW accumulator 1158-1 with a CW constant 1166. In one embodiment, CW constant 1166 is a nominal value that causes the CW light source to operate approximately on-resonance when the output of the CW C.C. demodulator 1156-1 is zero. The output of the CW summer 1160-1 is coupled to a second input of a first subtractor 1168, a first input of a second subtractor 1170, and as a reference frequency to a CW direct digital synthesizer chip 1172-1 (DDS). The output of CW DDS 1172-1 is the new $\Delta f_0$, which is calculated from the error signal to control the CW light source to on-resonance. This is fed as a reference signal to the CW PLL, such as CW PLL 430-1.

The digital signal processor 1150 processes the counter clockwise signal in a similar manner to the clockwise signal. In the particular embodiment shown in FIG. 11, the digital signal processor 1150 is configured to process a CCW signal having a component at least one resonance mode above the CW signal mode (referred to as the CCW1 signal) and a component at least one resonance mode below the CW signal mode (referred to as the CCW2 signal), as described above.

Thus, using a process similar to that described above, a CCW1 demodulator 1154-2 and a CCW2 demodulator 1154-3, in this example, use lock-in detection to discriminate between different signals. In addition, the CCW1 demodulator 1154-2 removes the CCW2 signal, leaving the CCW1 signal for further processing in the CCW1 demodulator 1154-2 through the summer 1160-2 similar to the CW signal discussed above. Similarly, the CCW2 demodulator 1154-3 removes the CCW1 signal, leaving the CCW2 signal for further processing in the CCW2 demodulator 1154-3 through the summer 1160-3 similar to the CW signal.

Furthermore, the output of a CCW1 DDS 1172-2 and a CCW2 DDS 1172-3 is $\Delta f_1$ and $\Delta_2$, respectively. These are fed as reference signals to the CCW light source, such as the CCW1 PLL 431-2 to bring the CCW beams on-resonance. The output of a CCW1 summer 1160-2 is coupled to a second input of the second subtractor 1170 and the output of the CCW2 summer 1160-3 is coupled to a first input of the first subtractor 1168.

In one embodiment, subtractor 1168 is coupled to a first input of a subtractor 1174 and subtractor 1170 is coupled to a second input of the subtractor 1174. Subtractors 1168 through 1174 function to implement the formula $2\Delta f_\Omega = (\Delta f_1 - \Delta f_2) - (\Delta f_1 \Delta f_2)$, where the output of the subtractor 1174 substantially equals twice $\Delta f_\Omega$, where $\Delta f_\Omega$ is proportional to rotation rate.

Figure 12:
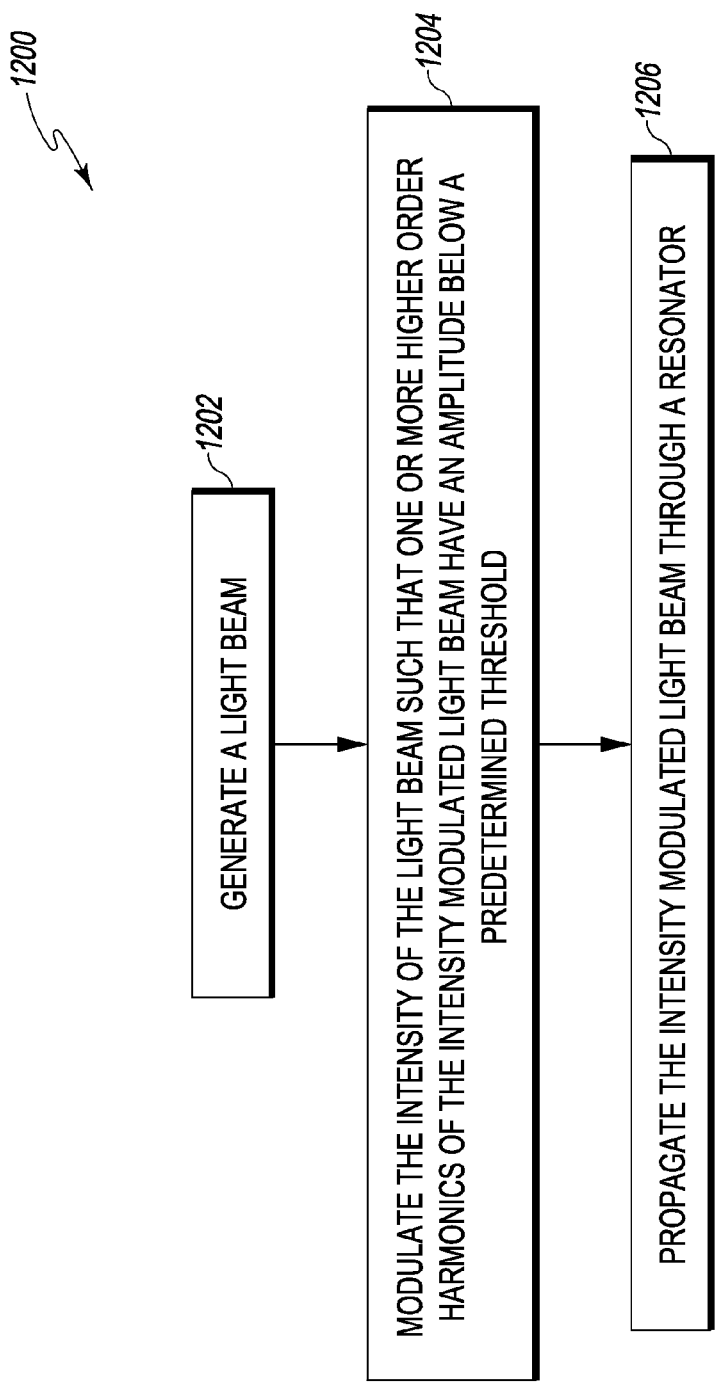
FIG. 12 is a flow chart of one embodiment of a method of reducing rotation sensing errors in a resonator fiber optic gyroscope.

FIG. 12 is a flow chart of one embodiment of a method 1200 of reducing rotation sensing errors in a resonator fiber optic gyroscope. At block 1202, a light beam is generated. For example, a light source such as the light sources described above can generate the light beam. In addition, the light source can be a slave light source locked to a reference laser, as described above, in some embodiments. At block 1204, the intensity of the generated light beam is modulated to produce an intensity modulated light beam. In particular, the intensity of the light beam is modulated such that one or more higher order harmonics of the intensity modulated light beam have an amplitude below a predetermined threshold. As described above, the threshold is determined such that amplitudes below the threshold have a negligible effect on counter propagating light beams. In addition, as used herein, the term 'higher order harmonics' refers to harmonics that potentially overlap a counter propagating light beam at zero rotation or during rotation.

In some embodiments, the intensity of the light beam is modulated at a frequency that is separated from a frequency of a free spectral range between adjacent resonance modes of the resonator, as described above. In particular, the separation distance between the intensity modulation frequency and the free spectral range frequency is selected such that the amplitudes of the one or more higher order harmonics are below the threshold.

In other embodiments, modulating the intensity of the light beam includes generating a modulation signal at a predetermined frequency, distorting the modulation signal, and modulating the intensity of the light beam based on the distorted modulation signal. The distortion of the modulation signal is selected such that the distorted modulation signal compensates for another non-linearity in the modulation of the light beam. In other embodiments, modulating the intensity of the light beam includes generating a triangle-wave modulation signal and multiplying the triangle-wave modulation signal by a multiplier value. The intensity of the light beam is then modulated based on the multiplied triangle-wave modulation signal.

At block 1206, the intensity modulated light beam is propagated through a resonator in a first direction. While propagating through the resonator, only the one or more higher order harmonics having amplitudes below the threshold overlap the frequency of a primary wave a light beam that is propagating through the resonator in a second opposite direction. Thus, the effect of the one or more higher order harmonics on the counter propagating light beam is negligible. In addition, propagating the intensity modulated light beam includes modulating the intensity modulate light beam using common cavity length modulation, as described above, in some embodiments. Although method 1200 has been described in terms of a single light beam, it is to be understood that method 1200 can be implemented for each light beam propagating through a resonator, as described above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator fiber optic gyroscope (RFOG) comprising:
   a resonator having an optical fiber loop;
   a light source configured to generate a light beam; and
   an intensity modulation circuit coupled between the light source and the resonator, the intensity modulation circuit configured to modulate the intensity of the light beam from the light source to output an intensity modulated signal to the resonator, wherein the intensity modulation circuit is configured to produce the intensity modulated signal such that harmonics of the intensity modulated signal which overlap a primary wave of a counter-propagating light beam in the resonator have an amplitude below a predetermined threshold, wherein amplitudes below the predetermined threshold are negligible;
   wherein the intensity modulation circuit comprises:
   a modulation signal generator configured to generate a signal at a predetermined frequency;
   a compensation circuit configured to distort the signal output from the modulation signal generator; and
   an intensity modulator coupled to the compensation circuit, the intensity modulator configured to modulate the intensity of the light beam from the light source based on the distorted signal output from the compensation circuit;
   wherein the distortion introduced by the compensation circuit compensates for non-linearity in the intensity modulator.

2. The resonator fiber optic gyroscope of claim 1, wherein the light source is a first light source that has a first frequency tuned to a first resonance frequency of the resonator and the intensity modulation circuit is a first intensity modulation circuit, wherein the RFOG further comprises:
   a second light source configured to generate a second light beam that has a second frequency tuned to a resonance frequency of the resonator that is at least one free spectral range above the first frequency of the first light beam;
   a second intensity modulation circuit coupled between the second light source and the resonator, the second intensity modulation circuit configured to modulate the second light beam to output a second intensity modulated signal;
   a third light source configured to generate a third light beam that has a third frequency tuned to a resonance frequency of the resonator that is at least one free spectral range below the first frequency of the first light beam;
   a third intensity modulation circuit coupled between the third light source and the resonator, the third intensity modulation circuit configured to modulate the third light beam to output a third intensity modulated signal; and
   a beam combiner configured to combine the second intensity modulated signal and the third intensity modulated signal, the beam combiner configured to output the combined intensity modulated signal to the resonator;
   wherein the first intensity modulated signal propagates through the resonator in a first direction and the combined intensity modulated signal propagates through the resonator in a second direction;
   wherein the second intensity modulation circuit and the third intensity modulation circuit are each configured to produce the respective second and third intensity modulated signals such that harmonics of the second and third intensity modulated signals which overlap a primary wave of the first intensity modulated signal have an amplitude below the predetermined threshold.

3. The resonator fiber optic gyroscope of claim 1, wherein the light source is a first light source and the intensity modulation circuit is a first intensity modulation circuit, wherein the RFOG further comprises:
   a second light source configured to generate a second light beam of a second frequency; wherein the second light source is configured to switch the second light beam frequency between a resonance frequency of the resonator that is at least one free spectral range above a frequency of the first light beam and a resonance frequency of the resonator that is at least one free spectral range below the frequency of the first light beam; and
   a second intensity modulation circuit coupled between the second light source and the resonator, the second intensity modulation circuit configured to modulate the second light beam to output a second intensity modulated signal;
   wherein the first intensity modulated signal propagates through the resonator in a first direction and the second intensity modulated signal propagates through the resonator in a second direction;
   wherein the second intensity modulation circuit is configured to produce the second intensity modulated signal such that harmonics of the second intensity modulated signal which overlap a primary wave of the first intensity modulated signal have an amplitude below the predetermined threshold.

4. The resonator fiber optic gyroscope of claim 1, further comprising:
   a beam splitter coupled between the light source and the intensity modulation circuit, the beam splitter configured to output a first portion of the light beam to the intensity modulation circuit;
   a frequency shifter coupled to the beam splitter, the beam splitter configured to output a second portion of the light beam to the frequency shifter, wherein the frequency shifter is configured to shift the frequency of the second portion of the light beam to produce a second light beam; and
   a second intensity modulation circuit coupled to the frequency shifter and configured to modulate the intensity of the second light beam to output a second intensity modulated signal to the resonator;

wherein the intensity modulated signal propagates in a first direction through the resonator and the second intensity modulated signal propagates in a second direction through the resonator;

wherein the second intensity modulation circuit is configured to produce the second intensity modulated signal such that harmonics of the second intensity modulated signal which overlap a primary wave of the first intensity modulated signal in the resonator have an amplitude below the predetermined threshold.

5. The resonator fiber optic gyroscope of claim 1, further comprising:
a reference laser generator configured to produce a reference light beam;
wherein the light source is a slave light source configured to lock the light beam to the reference light beam.

6. The resonator fiber optic gyroscope of claim 1, wherein the intensity modulation circuit is configured to modulate the intensity of the light beam at a frequency that is separated from a frequency of a free spectral range between adjacent resonance modes of the resonator by a separation distance, the separation distance selected such that the harmonics of the intensity modulated signal which overlap the primary wave of the counter-propagating light beam in the resonator have an amplitude below the predetermined threshold.

7. The resonator fiber optic gyroscope of claim 1, wherein the modulation signal generator
and the compensation circuit are implemented as digital electronic circuits;
wherein the intensity modulation circuit further comprises a digital to analog converter configured to convert the distorted signal from the compensation circuit to an analog signal and to output the analog distorted signal to the intensity modulator.

8. The resonator fiber optic gyroscope of claim 1, wherein the modulation signal generator is configured to generate a triangle-wave signal; and
the compensation circuit comprises a multiplier coupled to the modulation signal generator and configured to multiply the triangle-wave by a multiplier value.

9. A system comprising:
a resonator fiber optic gyroscope (RFOG) configured to measure rotation rate; and
a processing unit coupled to the resonator fiber optic gyroscope and configured to perform calculations based on the rotation rate measured by the resonator fiber optic gyroscope;
wherein the resonator fiber optic gyroscope includes:
a resonator having an optical fiber loop;
a light source configured to generate a light beam; and
an intensity modulation circuit coupled between the light source and the resonator, the intensity modulation circuit configured to modulate the intensity of the light beam from the light source to output an intensity modulated signal to the resonator, wherein the intensity modulation circuit is configured to produce the intensity modulated signal such that harmonics of the intensity modulated signal which overlap a primary wave of a counter-propagating light beam in the resonator have an amplitude below a predetermined threshold, wherein amplitudes below the predetermined threshold are negligible;
wherein the intensity modulation circuit comprises:
a modulation signal generator configured to generate a signal at a predetermined frequency;
a compensation circuit configured to distort the signal output from the modulation signal generator; and
an intensity modulator coupled to the compensation circuit, the intensity modulator configured to modulate the intensity of the light beam from the first light source based on the distorted signal output from the compensation circuit;
wherein the distortion introduced by the compensation circuit compensates for non-linearity in the intensity modulator.

10. The resonator fiber optic gyroscope of claim 9, wherein the light source is a first light source and the intensity modulation circuit is a first intensity modulation circuit, wherein the RFOG further comprises:
a second light source configured to generate a second light beam of a second frequency at a resonance frequency of the resonator that is at least one free spectral range above the frequency of the first light beam;
a second intensity modulation circuit coupled between the second light source and the resonator, the second intensity modulation circuit configured to modulate the second light beam to output a second intensity modulated signal;
a third light source configured to generate a third light beam of a third frequency at a resonance frequency of the resonator that is at least one free spectral range below the resonance frequency of the first light beam;
a third intensity modulation circuit coupled between the third light source and the resonator, the third intensity modulation circuit configured to modulate the third light beam to output a third intensity modulated signal; and
a beam combiner configured to combine the second intensity modulated signal and the third intensity modulated signal, the beam combiner configured to output the combined intensity modulated signal to the resonator;
wherein the first intensity modulated signal propagates through the resonator in a first direction and the combined intensity modulated signal propagates through the resonator in a second direction;
wherein the second intensity modulation circuit and the third intensity modulation circuit are each configured to produce the respective second and third intensity modulated signals such that harmonics of the second and third intensity modulated signals which overlap a primary wave of the first intensity modulated signal have an amplitude below the predetermined threshold.

11. The resonator fiber optic gyroscope of claim 9, wherein the light source is a first light source and the intensity modulation circuit is a first intensity modulation circuit, wherein the RFOG further comprises:
a second light source configured to generate a second light beam of a second frequency; wherein the second light source is configured to switch the second light beam frequency between a resonance frequency that is at least one free spectral range above the frequency of the first light beam and a resonance frequency that is at least one free spectral range below the resonance frequency of the first light beam; and
a second intensity modulation circuit coupled between the second light source and the resonator, the second intensity modulation circuit configured to modulate the second light beam to output a second intensity modulated signal;
wherein the first intensity modulated signal propagates through the resonator in a first direction and the second intensity modulated signal propagates through the resonator in a second direction;
wherein the second intensity modulation circuit is configured to produce the second intensity modulated signal such that harmonics of the second intensity modulated signal which overlap a primary wave of the first intensity modulated signal have an amplitude below the predetermined threshold.

12. The resonator fiber optic gyroscope of claim 9, further comprising:
a beam splitter coupled between the light source and the intensity modulation circuit, the beam splitter configured to output a first portion of the light beam to the intensity modulation circuit;
a frequency shifter coupled to the beam splitter, the beam splitter configured to output a second portion of the light beam to the frequency shifter, wherein the frequency shifter is configured to shift the frequency of the second portion of the light beam to produce a second light beam; and
a second intensity modulation circuit coupled to the frequency shifter and configured to modulate the intensity of the second light beam to output a second intensity modulated signal to the resonator;
wherein the intensity modulated signal propagates in a first direction through the resonator and the second intensity modulated signal propagates in a second direction through the resonator;
wherein the second intensity modulation circuit is configured to produce the second intensity modulated signal such that harmonics of the second intensity modulated signal which overlap a primary wave of the first intensity modulated signal in the resonator have an amplitude below the predetermined threshold.

13. The resonator fiber optic gyroscope of claim 9, further comprising:
a reference laser generator configured to produce a reference light beam;
wherein the light source is a slave light source configured to lock the light beam to the reference light beam.

14. The resonator fiber optic gyroscope of claim 9, wherein the intensity modulation circuit is configured to modulate the intensity of the light beam at a frequency that is separated from a frequency of a free spectral range between adjacent resonance modes of the resonator by a frequency separation distance, the frequency separation distance selected such that the harmonics of the intensity modulated signal which overlap the primary wave of the counter-propagating light beam in the resonator have an amplitude below the predetermined threshold.

15. The resonator fiber optic gyroscope of claim 9, wherein the modulation signal generator
and the compensation circuit are implemented as digital electronic circuits;
wherein the intensity modulation circuit further comprises a digital to analog converter configured to convert the distorted signal from the compensation circuit to an analog signal and to output the analog distorted signal to the intensity modulator.

16. The resonator fiber optic gyroscope of claim 9, wherein the modulation signal generator is configured to generate a triangle-wave signal; and
the compensation circuit comprises a multiplier coupled to the modulation signal generator and configured to multiply the triangle-wave by a multiplier value.

17. A method of reducing rotation sensing errors in a resonator fiber optic gyroscope, the method comprising:
generating a light beam;
modulating the intensity of the light beam to produce an intensity modulated light beam having one or more higher order harmonics with an amplitude below a predetermined threshold; and
propagating the intensity modulated light beam through a resonator in a first direction, wherein only the one or more higher order harmonics with an amplitude below a predetermined threshold overlap the frequency of a primary wave of a light beam propagating through the resonator in a second direction opposite the first direction;
wherein modulating the intensity of the light beam comprises:
generating a modulation signal at a predetermined frequency;
distorting the modulation signal; and
modulating the intensity of the light beam based on the distorted modulation signal, wherein the distorted modulation signal compensates for non-linearity in the modulation of the light beam.

18. The method of claim 17, wherein modulating the intensity of the light beam comprises modulating the intensity of the light beam at a frequency that is separated from a frequency of a free spectral range between adjacent resonance modes of the resonator by a separation distance, the frequency separation distance selected such that the one or more higher order harmonics of the intensity modulated signal which overlap the primary wave of the light beam propagating in the second direction have an amplitude below the predetermined threshold.

19. The method of claim 17, wherein
generating a modulation signal at a predetermined frequency comprises generating a digital modulation signal; and
distorting the modulation signal comprises distorting the digital modulation signal; the method further comprising:
converting the distorted digital modulation signal to an analog modulation signal.

20. The method of claim 17, wherein modulating the intensity of the light beam comprises:
generating a triangle-wave modulation signal;
multiplying the triangle-wave modulation signal by a multiplier value; and
modulating the intensity of the light beam based on the multiplied triangle-wave modulation signal.

* * * * *